(12) United States Patent
Jentz et al.

(10) Patent No.: US 10,618,380 B2
(45) Date of Patent: Apr. 14, 2020

(54) METHOD AND SYSTEM FOR COOLANT TEMPERATURE SENSOR DIAGNOSTICS

(71) Applicant: Ford Global Technologies, LLC, Dearborn, MI (US)

(72) Inventors: Robert Roy Jentz, Westland, MI (US); Vincent Martinez, Royal Oak, MI (US); Sanyam Sharma, Dearborn, MI (US); Sitaram Rejeti, Farmington, MI (US); Arjun Sadahalli, Natick, MA (US)

(73) Assignee: Ford Global Technologies, LLC, Dearborn, MI (US)

( * ) Notice: Subject to any disclaimer, the term of this patent is extended or adjusted under 35 U.S.C. 154(b) by 225 days.

(21) Appl. No.: 15/665,587

(22) Filed: Aug. 1, 2017

(65) Prior Publication Data

US 2019/0039437 A1    Feb. 7, 2019

(51) Int. Cl.
*B60H 1/00* (2006.01)
*F01N 11/00* (2006.01)
*F01N 5/02* (2006.01)
*B60H 1/02* (2006.01)
*B60H 1/20* (2006.01)
*F01N 1/00* (2006.01)
*F01N 13/08* (2010.01)
*F01N 9/00* (2006.01)
*B60H 1/22* (2006.01)
*F01N 3/10* (2006.01)

(52) U.S. Cl.
CPC ......... *B60H 1/00978* (2013.01); *B60H 1/025* (2013.01); *B60H 1/20* (2013.01); *F01N 1/00* (2013.01); *F01N 5/02* (2013.01); *F01N 11/00* (2013.01); *F01N 13/087* (2013.01); *B60H 2001/2246* (2013.01); *B60H 2001/2256* (2013.01); *F01N 3/10* (2013.01); *F01N 2230/04* (2013.01); *F01N 2240/02* (2013.01); *F01N 2410/00* (2013.01); *F01N 2550/00* (2013.01); *F01N 2900/00* (2013.01)

(58) Field of Classification Search
CPC ... F01N 1/00; F01N 1/165; F01N 3/10; F01N 9/00; F01N 13/08; B60H 1/00; F02D 41/00
USPC .............. 701/36, 103; 123/519, 41.57, 41.09
See application file for complete search history.

(56) References Cited

U.S. PATENT DOCUMENTS 6,848,434 B2    2/2005  Li et al.
8,515,710 B2    8/2013  Wang et al.
(Continued)

*Primary Examiner* — Tan Q Nguyen
(74) *Attorney, Agent, or Firm* — Geoffrey Brumbaugh; McCoy Russell LLP

(57) ABSTRACT

Methods and systems are provided for on-board diagnostics of components of an exhaust gas heat recovery (EGHR) system including engine coolant temperature sensors coupled to the system. Degradation of one or more of a first coolant temperature sensor coupled upstream of a heat exchanger of the EGHR system and a second coolant temperature sensor coupled downstream of the heat exchanger may be indicated based on a difference between a modeled coolant temperature and a measured coolant temperature, the modeled coolant temperature based on one or more of heat transfer between a heater core and vehicle cabin, and heat transfer between exhaust flowing via the heat exchanger and coolant flowing through the heat exchanger.

20 Claims, 8 Drawing Sheets

(56) References Cited

U.S. PATENT DOCUMENTS

| | | |
|---|---|---|
| 8,849,548 B2 | 9/2014 | Luft et al. |
| 10,046,759 B2 * | 8/2018 | Ishikawa ............ B60W 50/0225 |
| 2005/0102076 A1 * | 5/2005 | Kariya .................. F02D 41/222 |
| | | 701/30.2 |
| 2008/0307851 A1 * | 12/2008 | Smith ................. F02D 41/1446 |
| | | 73/1.06 |
| 2010/0125401 A1 * | 5/2010 | Hamama ................. F01P 7/167 |
| | | 701/103 |
| 2013/0312712 A1 | 11/2013 | Yamamoto |
| 2013/0313031 A1 | 11/2013 | Porras et al. |
| 2013/0319038 A1 * | 12/2013 | Kawase ............. B60H 1/00278 |
| | | 62/498 |
| 2014/0316644 A1 * | 10/2014 | Kim ......................... F01P 7/16 |
| | | 701/34.4 |
| 2015/0107345 A1 * | 4/2015 | Sugimoto ................ F01P 11/16 |
| | | 73/114.68 |

* cited by examiner

METHOD AND SYSTEM FOR COOLANT TEMPERATURE SENSOR DIAGNOSTICS

FIELD

The present description relates generally to methods and systems for on-board diagnostics of engine coolant temperature sensors coupled to an exhaust gas heat recovery system.

BACKGROUND/SUMMARY

Engines may be configured with an exhaust gas heat recovery (EGHR) system for recovering heat from exhaust gas. During lower engine temperature and/or during vehicle cabin heating demands, exhaust may be routed via the EGHR system and exhaust heat may be recovered by coolant flowing through a heat exchanger of the EGHR system. Coolant with the recovered exhaust heat may be circulated via the engine and/or the heater core of an on-board heating, ventilation, and air conditioning (HVAC) system, and exhaust heat may be utilized for providing heat to the engine and also to warm the vehicle cabin, thereby improving engine, and fuel efficiency. A diagnostic procedure may need to be periodically or opportunistically carried out to monitor different components of the EGHR system including the coolant temperature sensors housed in coolant lines fluidically coupled to the heat exchanger of the EGHR system.

Various approaches are provided for diagnostics of engine coolant temperature sensors. In one example, as shown in U.S. Pat. No. 6,848,434, Li et al. discloses a method for diagnosing a coolant temperature sensor coupled to an engine coolant system. A coolant temperature may be modeled based on each of an energy flow between engine and coolant, an energy flow between coolant and air, and an energy flow from coolant to radiator. Upon indication of engine warm up based on the modeled coolant temperature, diagnostics of the coolant sensor may be carried out based on a comparison of a coolant temperature estimated via the coolant temperature sensor and a pre-determined regulated temperature.

However, the inventors herein have recognized potential issues with the above approach. As one example, in embodiments having an EGHR system, multiple coolant temperature sensors may be housed in the coolant lines coupled to the EGHR system and rationality of each coolant temperature sensor needs to be monitored independently. The coolant temperature at each location of the EGHR system may be different at distinct modes of operation of the EGHR system and it may not be possible to use a single model for computing coolant temperature at each location in the EGHR system during operation of the EGHR system in each operating mode. Further, by modeling coolant temperature solely based on energy flow between each of the engine, coolant, air, and radiator, it may not be possible to quantify energy loss during heat transfer between the aforementioned components, thereby reducing the accuracy of the temperature model.

The inventors herein have identified an approach by which the issues described above may be at least partly addressed. One example method comprises, during exhaust flow from a vehicle engine across a heat exchanger having a coolant flowing there through, in response to a higher than threshold difference between a measured coolant temperature and a modeled coolant temperature which is based on heat transfer between a heat loss source and a vehicle cabin, indicating degradation of a first and/or a second coolant temperature sensor respectively coupled upstream and downstream of the heat exchanger. In this way, by using separate temperature models for computing coolant temperature at distinct locations in the EGHR system and comparing measured coolant temperature to modeled coolant temperature, degradation of one or more coolant temperature sensors may be independently detected.

In one example, an engine system may be configured with an exhaust gas heat recovery (EGHR) system including a heat exchanger. The heat exchanger may be positioned in an exhaust bypass passage, disposed parallel to a main exhaust passage, and a diverter valve coupled to the main exhaust passage may be used to enable exhaust to be diverted into the bypass passage or directed through the main passage into the tailpipe. Based on engine heating and/or vehicle cabin heating demands, the EGHR system may be operated in a plurality of modes by adjusting a position of the diverter valve. As an example, during higher engine and/or cabin heating demands, the diverter valve may be actuated to a first position (first mode of operation of EGHR system) to flow exhaust to the tailpipe via the heat exchanger and once the engine temperature has increased above a threshold and vehicle cabin heating is no longer desired, the diverter valve may be actuated to a second position (second mode of operation of EGHR system) to flow exhaust directly to the tailpipe bypassing the heat exchanger. During exhaust flow via the heat exchanger, engine coolant may be routed via the heat exchanger, wherein heat from the exhaust may be transferred to the coolant. The coolant with the exhaust heat may then be routed via the engine and the heater core of the vehicle HVAC system wherein the exhaust heat may be used to increase engine and/or vehicle cabin temperature. A first coolant temperature sensor may be coupled to a first coolant line entering the heat exchanger (upstream of the heat exchanger) and a second coolant temperature sensor may be coupled to a second coolant line exiting the heat exchanger (downstream of the heat exchanger). During operation of the EGHR system in the first mode when exhaust is routed via heat exchanger, coolant temperature upstream of the heat exchanger may be modeled using two distinct modeling approaches. Each of the two modeling approaches for computing coolant temperature upstream of the heat exchanger may be based on heat loss during heat transfer from the heater core and coolant lines to the vehicle cabin. The modeled coolant temperature upstream of the heat exchanger may be calibrated and optimized over a plurality of HVAC system operating conditions upstream of the heat exchanger. Coolant temperature downstream of the heat exchanger may be also modeled using two distinct modeling approaches. Each of the two modeling approaches for computing coolant temperature downstream of the heat exchanger may be based on heat loss during heat transfer from the exhaust gas to the heat exchanger and the modeled coolant temperature upstream of the heat exchanger. The optimized modeled coolant temperature upstream of the heat exchanger may be compared to a measured coolant temperature and in response to a higher than threshold difference between the modeled temperature and the measured temperature, degradation of the first coolant temperature may be detected. Similarly, the modeled coolant temperature downstream of the heat exchanger may be compared to a measured coolant temperature and in response to a higher than threshold difference between the modeled temperature and the measured temperature, degradation of the second coolant temperature may be detected. In addition to diagnostics of the coolant temperature sensors, during operation of the EGHR system in the exhaust heat, diagnostics of the diverter valve and the heat exchanger may also be carried out.

In this way, by using distinct mathematical approaches to model coolant temperature upstream and downstream of a heat exchanger of the EGHR system, degradation of a first coolant temperature sensor upstream of the heat exchanger may be differentiated from degradation of a second coolant temperature sensor downstream of the heat exchanger and appropriate mitigating actions may be performed. By opportunistically carrying out the diagnostics of the coolant temperature sensors, the diverter valve, and the heat exchanger during specific modes of operation of the EGHR system, the possibility of false detection of degradation of the one or more components of the EGHR system may be decreased. The technical effect of including heat loss between one or more vehicle components including the heater core, the coolant lines, the vehicle cabin, exhaust gas, and the heat exchangers in computation of the modeled temperature is that accuracy of the modeled temperature upstream and downstream of the heat exchanger may be improved. By enabling diagnostics of the coolant temperature sensors to be carried out reliably and accurately, propensity of coolant overheating may be reduced and robustness of the HVAC system may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
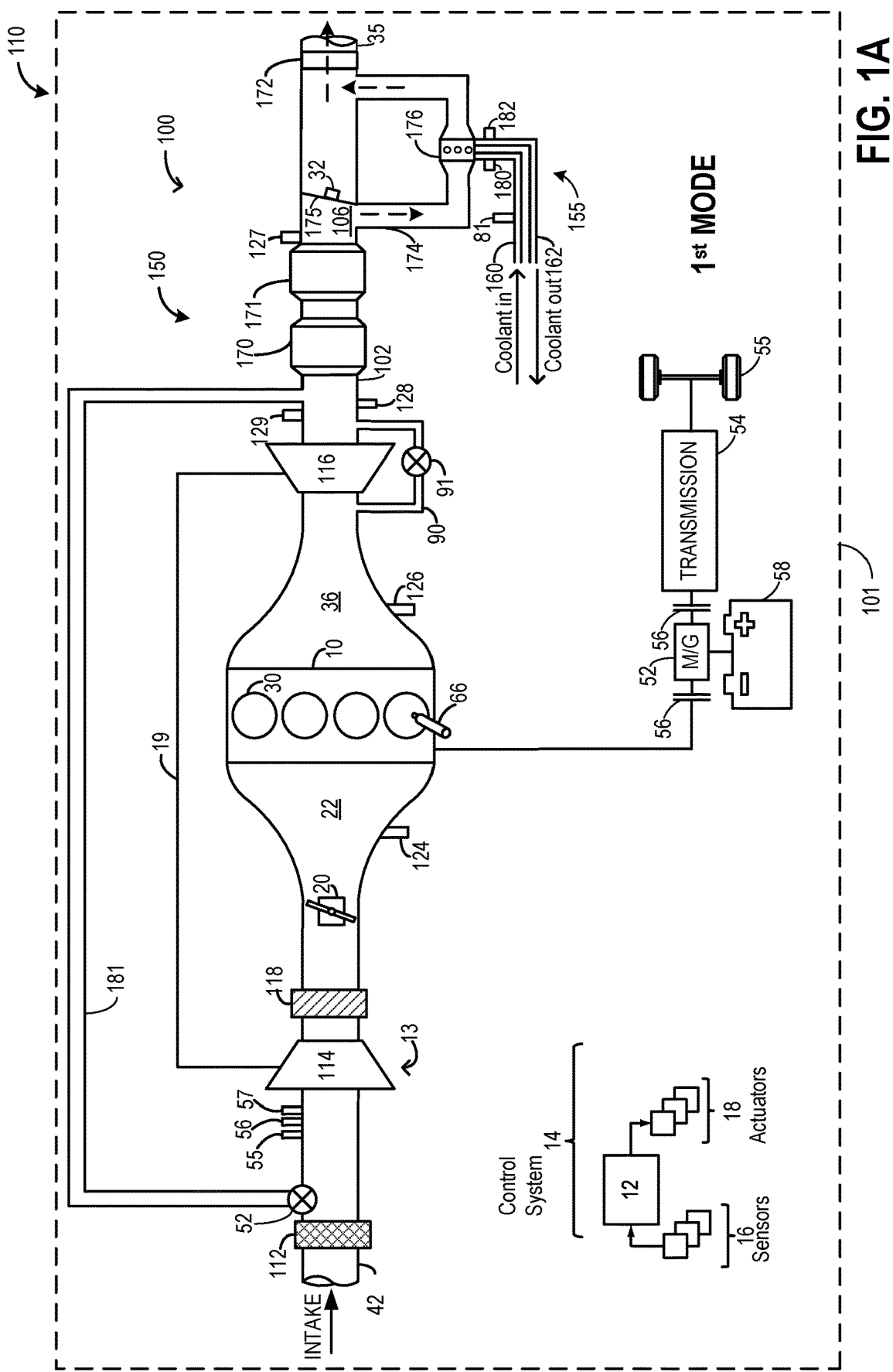
FIG. 1A shows an example embodiment of an engine system including an exhaust gas heat recovery (EGHR) system, operating in a first mode.
Figure 1B:
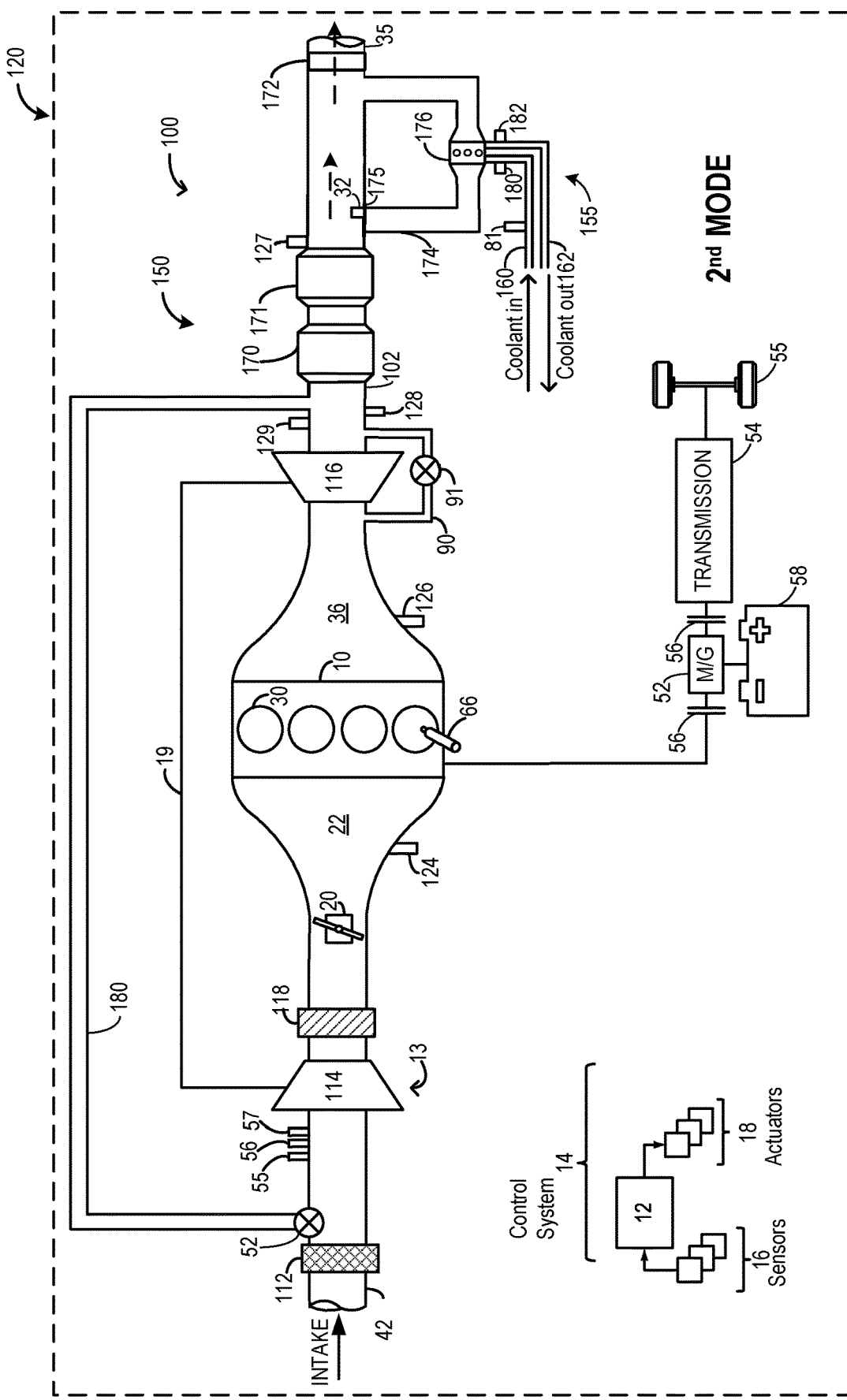
FIG. 1B shows an example embodiment of an engine system including the EGHR system, operating in a second mode.
Figure 2:
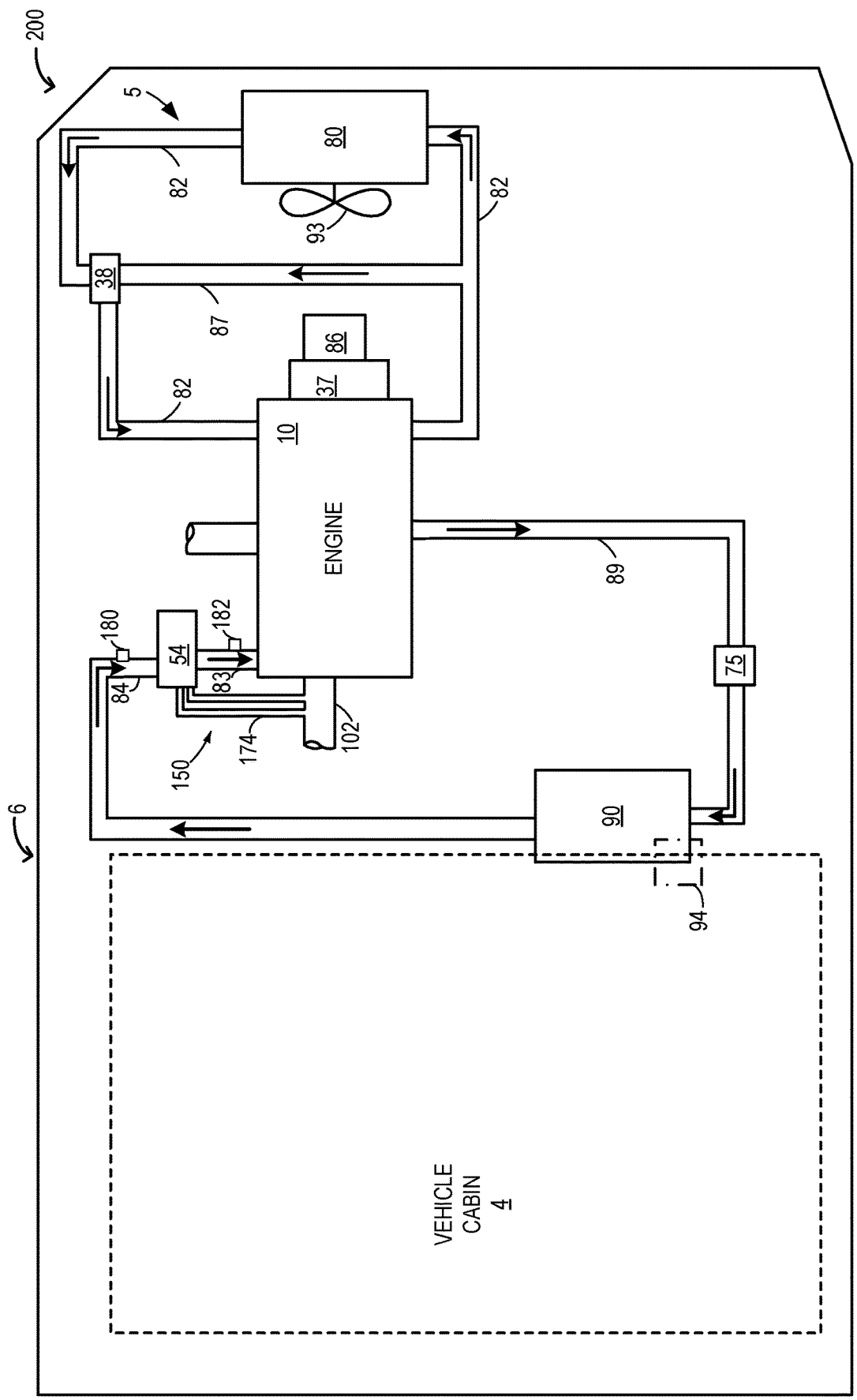
FIG. 2 shows an example vehicle heating, ventilation and air-conditioning (HVAC) system fluidically coupled to the EGHR system in FIGS. 1A-1B.
Figure 3:
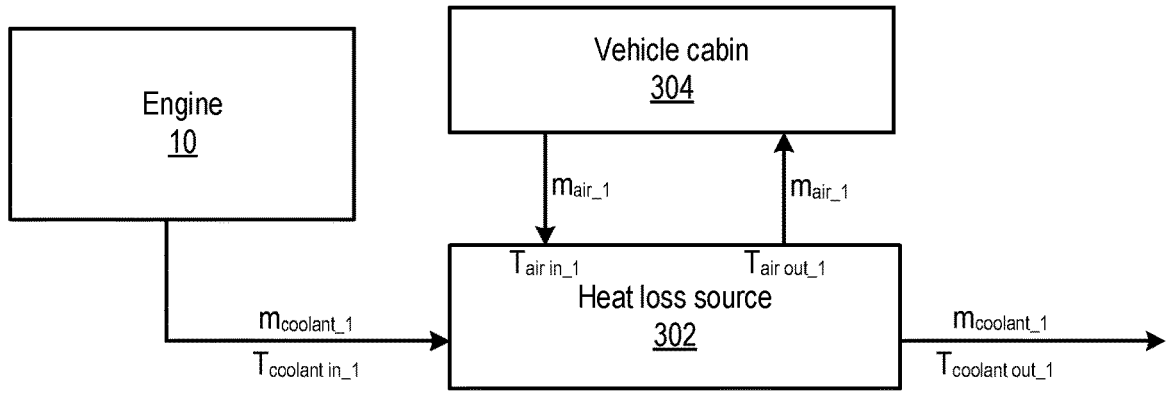
FIG. 3 shows an example schematic of the modeling technique used in diagnostics of the coolant temperature sensor coupled upstream of an EGHR system heat exchanger.
Figure 4:
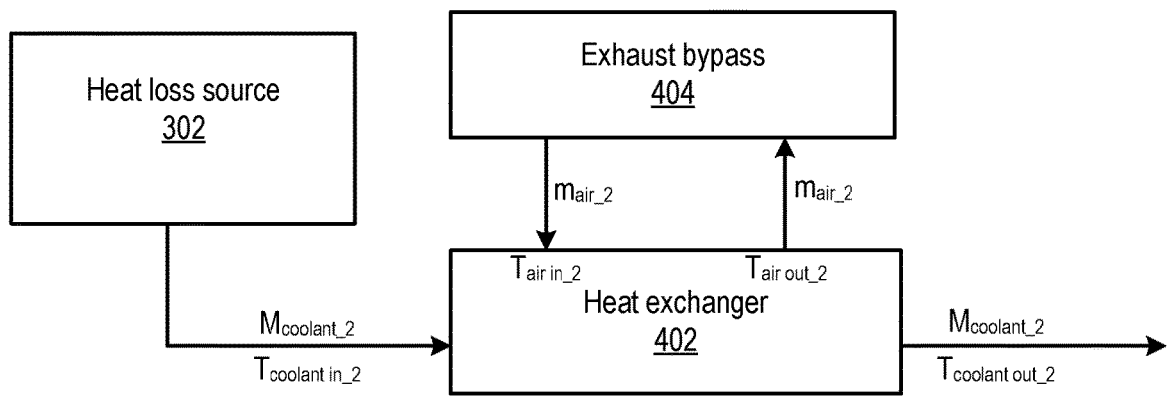
FIG. 4 shows an example schematic of the modeling technique used in diagnostics of the coolant temperature sensor coupled downstream of the EGHR system heat exchanger.

The following description relates to systems and methods for on-board diagnostics of a plurality of engine coolant temperature sensors coupled to an exhaust gas heat recovery (EGHR) system. The EGHR system may include a heat exchanger (coupled to a bypass passage) for exhaust gas heat recovery. Different modes of operation of the EGHR system are shown in FIGS. 1A-1B. An example vehicle HVAC system fluidically coupled to the EGHR system is shown in FIG. 2. Example schematics of the modeling techniques used in diagnostics of the coolant temperature sensors coupled upstream and downstream of the EGHR system heat exchanger are shown in FIGS. 3-4. An engine controller may be configured to perform control routines, such as the example routines of FIGS. 5-8 to periodically or opportunistically diagnose components of the EGHR system including the diverter valve, the heat exchanger, and the coolant temperature sensors coupled upstream and downstream of the EGHR system. An example diagnostic routine is shown with reference to FIG. 8.

FIG. 1A shows a schematic view 110 of a vehicle system 101 with an example engine system 100 including an engine 10. In one example, the engine system 100 may be a diesel engine system. In one example, the engine system 100 may be a gasoline engine system. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1A, compressor 114 is coupled through charge-air cooler (CAC) 118 to throttle valve 20. Throttle valve 20 is coupled to engine intake manifold 22. From the compressor, the compressed air charge flows through the charge-air cooler 118 and the throttle valve 20 to the intake manifold 22. In the embodiment shown in FIG. 1A, the pressure of the air charge within the intake manifold 22 is sensed by manifold air pressure (MAP) sensor 124.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator 92 may be actuated open to dump at least some exhaust pressure from upstream of the turbine to a location downstream of the turbine via wastegate 91. By reducing exhaust pressure upstream of the turbine, turbine speed can be reduced, which in turn helps to reduce compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied with one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof In the combustion chambers, combustion may be initiated via spark ignition and/or compression ignition.

As shown in FIG. 1A, exhaust from the one or more exhaust manifold sections may be directed to turbine 116 to drive the turbine. The combined flow from the turbine and the wastegate then flows through emission control devices 170 and 171. In one example, the first emission control device 170 may be a light-off catalyst, and the second emissions control device 171 may be an underbody catalyst. In general, the exhaust after-treatment devices 170 and 171 are configured to catalytically treat the exhaust flow, and thereby reduce an amount of one or more substances in the exhaust flow. For example, the exhaust after-treatment devices 170 and 171 may be configured to trap $NO_x$ from the exhaust flow when the exhaust flow is lean, and to reduce the trapped $NO_x$ when the exhaust flow is rich. In other examples, the exhaust after-treatment devices 170 and 171 may be configured to disproportionate $NO_x$ or to selectively reduce $NO_x$ with the aid of a reducing agent. In still other examples, the exhaust after-treatment devices 170 and 171 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

Exhaust gas recirculation (EGR) delivery passage 181 may be coupled to the exhaust passage 102 downstream of turbine 116 to provide low pressure EGR (LP-EGR) to the engine intake manifold, upstream of compressor 114. An EGR valve 52 may be coupled to the EGR passage 181 at the junction of the EGR passage 181 and the intake passage 42. EGR valve 52 may be opened to admit a controlled amount of exhaust to the compressor inlet for desirable combustion and emissions control performance. EGR valve 52 may be configured as a continuously variable valve or as an on/off valve. In further embodiments, the engine system may include a high pressure EGR flow path wherein exhaust gas is drawn from upstream of turbine 116 and recirculated to the engine intake manifold, downstream of compressor 114. In further embodiments, the engine system may include a high pressure EGR flow path wherein exhaust gas is drawn from upstream of turbine 116 and recirculated to the engine intake manifold, downstream of compressor 114.

One or more sensors may be coupled to EGR passage 181 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors 55-57 coupled to the compressor inlet. In one example, air-fuel ratio sensor 57 is an oxygen sensor.

A plurality of sensors, including an exhaust temperature sensor 128, an exhaust oxygen sensor, an exhaust flow sensor, and exhaust pressure sensor 129 may be coupled to the main exhaust passage 102. The oxygen sensor may be linear oxygen sensors or UEGO (universal or wide-range exhaust gas oxygen), two-state oxygen sensors or EGO, HEGO (heated EGO), a NOx, HC, or CO sensors.

From downstream of the second emission control device 171, exhaust may flow to muffler 172 via one or more of a main exhaust passage 102 and a bypass passage 174. For example, all or part of the treated exhaust from the exhaust after-treatment devices 170 and 171 may be released into the atmosphere via main exhaust passage 102 after passing through a muffler 172. Alternatively, all or part of the treated exhaust from the exhaust after-treatment devices 170 and 171 may be released into the atmosphere via an exhaust gas heat recovery (EGHR) system 150 coupled to the main exhaust passage. The EGHR system 150 can be operated for exhaust heat recovery for use in engine heating and vehicle cabin heating.

Bypass passage 174 of the exhaust heat exchange system 150 may be coupled to the main exhaust passage 102 downstream of the second emission control device 171 at junction 106. The bypass passage 174 may extend from downstream of the second emission control device 171 to upstream of muffler 172. The bypass passage 174 may be arranged parallel to the main exhaust passage 102. A heat exchanger 176 may be coupled to bypass passage 174 to extract heat from the exhaust passing through the bypass passage 174. In one example, the heat exchanger 176 is a water-gas exchanger.

A diverter valve 175 coupled to the junction of the main exhaust passage 102 and an inlet of the bypass passage 174, upstream of the heat exchanger 176, may be used to regulate the flow of exhaust through the bypass passage 174. A position of the diverter valve may be adjusted responsive to signals received from an engine controller to operate the EGHR in a selected mode of operation. In one example, the diverter valve may be actuated to a first fully open position to flow the entire volume of exhaust flow from downstream of the catalyst (second emission control device) 171 to the tailpipe 35 via the exhaust bypass 174, thereby enabling the EGHR system to be operated in a first mode where exhaust heat recovery is provided. As another example, the diverter valve may be actuated to a second, fully closed position to direct all exhaust to the tailpipe via the main exhaust passage while disabling exhaust flow from downstream of the catalyst 171 to the tailpipe 35 via the exhaust bypass 174 thereby enabling the EGHR system to be operated in a second mode where exhaust heat recovery is not provided. As such, the position of the diverter valve 175 may be adjusted to maintain a desired engine coolant temperature, the desired engine coolant temperature based on each of engine heating demand and vehicle cabin heating. A position sensor 32 may be coupled to the diverter valve 175 to detect a position of the diverter valve.

Coolant lines of a vehicle on-board heating, ventilation, and air conditioning (HVAC) system 155 may be fluidically coupled to the exhaust heat exchanger 176 for exhaust heat recovery. Coolant of the HVAC system may flow through the heat exchanger via a coolant inlet line 160 and after circulating through the heat exchanger, the coolant may return to the engine via a coolant outlet line 162. An auxiliary pump 81 may be coupled to the coolant inlet line 160 to enable coolant flow via the heat exchanger 176. A first coolant temperature sensor 180 may be coupled to the coolant inlet line 160, upstream of the heat exchanger 176, to measure the temperature of coolant entering the heat exchanger. A second coolant temperature sensor 182 may be coupled to the coolant outlet line 162, downstream of the heat exchanger 176, to measure the temperature of coolant exiting the heat exchanger. Diagnostics of each of the coolant temperature sensors 180 and 182 may be opportunistically carried out to detect any degradation of the coolant sensors. Example control routines for diagnostics of coolant temperature sensors 180 and 182 are described with regard to FIGS. 6-7.

In one example, degradation of the diverter valve 175 may be indicated responsive to an actual position of the diverter valve 175 as estimated based on input from a diverter valve position sensor 32 differing from an expected position of the diverter valve. The expected position of the diverter valve 175 may include one of a first position during a higher than threshold engine heating demand and/or a higher than threshold vehicle cabin heating demand enabling exhaust flow via the heat exchanger 176 and a second position during a lower than threshold engine heating demand and a lower than threshold vehicle cabin heating demand disabling exhaust flow via the heat exchanger 176. Further, degradation of the heat exchanger 176 may be indicated responsive to an expected temperature difference between coolant temperature upstream and downstream of the heat exchanger 176 being different from an actual temperature difference between coolant temperature upstream and downstream of the heat exchanger, the expected temperature difference based on each of the actual position of the diverter valve 175, the mass coolant flow rate via the heat exchanger 176, and exhaust flow rate, and the actual difference based on inputs from the first coolant temperature sensor 180 and the second coolant temperature sensor 182. Details of the diagnostics of the diverter valve 175 and the heat exchanger 176 is discussed with reference to FIG. 5.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include first coolant temperature sensor 180 coupled to the coolant inlet line 160, second coolant temperature sensor 182 coupled to the coolant outlet line 162, diverter valve position sensor 32, exhaust gas sensor 126 located upstream of the turbine 116, MAP sensor 124, exhaust temperature sensor 128, exhaust pressure sensor 129, compressor inlet temperature sensor 55, compressor inlet pressure sensor 56, compressor inlet humidity sensor 57, and EGR sensor. Other sensors such as additional pressure, temperature, air/fuel ratio, and composition sensors may be coupled to various locations in engine system 100. The actuators 18 may include, for example, throttle 20, EGR valve 52, diverter valve 175, wastegate 92, and fuel injector 66. The control system 14 may include a controller 12. The controller 12 may receive input data from the various sensors, process the input data, and trigger various actuators in response to the processed input data based on instruction or code programmed therein corresponding to one or more routines. For example, based on engine temperature, the controller 12 may command a signal to an actuator coupled to the diverter valve 175 to direct exhaust to the tailpipe via the heat exchanger 176. Also, the controller may periodically or opportunistically diagnose each of the coolant temperature sensors 180 and 182 based on inputs from and a plurality of HVAC system sensors.

FIG. 1A shows operation of the EGHR system 150 in a first operating mode. As such, the first operating mode represents a first setting of the diverter valve 175 that enables exhaust flow control. In the first operating mode, the diverter valve 175 may be in a first (fully open) position. When in the first operating mode, due to the first position of the diverter valve 175, the entire volume of exhaust exiting the second emissions control device 171 may be diverted into the bypass passage via the open diverter valve 175. The exhaust may then flow through the heat exchanger 176 and return to the main exhaust passage. After re-entering the main exhaust passage 102, exhaust may flow through muffler 172, and then be released into the atmosphere via the tailpipe 35. As the exhaust passes through the heat exchanger 176, heat from the exhaust may be transferred to the coolant circulating through the heat exchanger 176. Upon transfer of heat from the exhaust to the coolant, the warmed coolant may be circulated back to and around the engine (such as when engine heating is required) and/or through a heater core for heating a passenger cabin of the vehicle (such as when cabin heating is requested) via the coolant outlet line 162.

The exhaust heat exchange system may be operated in the first operating mode (as described above) during conditions when exhaust heat needs to be recovered for heating the engine, such as during engine cold-start conditions. By diverting exhaust through the heat exchanger 176 during an engine cold-start, heat from the exhaust may be recovered at the heat exchanger and transferred to the coolant circulating through the heat exchanger 176. The hot coolant may then be circulated around an engine block so that heat extracted from the exhaust may be used for engine warm-up. In one example, engine heating may be desired when the temperature of coolant in the coolant inlet, as estimated via the first coolant temperature sensor 180, is lower than a first threshold temperature. Operation of the EGHR system may be continued in the first mode until the temperature of coolant in the coolant inlet increases to a second threshold temperature, wherein the second threshold temperature is higher than the first threshold temperature. Once the temperature of coolant entering the heat exchanger 176 reaches the second threshold temperature, it may be inferred that the engine temperature has reached an optimal operating temperature and heat is no longer extracted from the heater core for cabin heating purposes and the operation of the EGHR system 150 may be transitioned from the first mode to the second mode (as described in relation to FIG. 1B).

By expediting engine warm-up during the cold-start, cold-start exhaust emissions may be reduced, and engine performance may be improved. In addition, if vehicle heating is desired by the operator such as by adjusting a vehicle cabin temperature setting, the hot coolant may be circulated around a heater core of the HVAC system 155 for providing heat to a passenger cabin of the vehicle.

During operation in the first mode, on-board diagnostics of the each of the coolant temperature sensors 180 and 182 may be carried out using inputs from the exhaust temperature sensor 128 and a plurality of HVAC system sensors. In one example, if at least one of the first coolant temperature sensor 180 and the second coolant temperature sensor 182 is degraded, temperature of coolant entering the heat exchanger 176 and/or exiting the heat exchanger 176 may not be accurately estimated and consequently the amount of heat transferred to the coolant may not be quantified. Erroneous estimation of coolant temperature may result in excess heat transfer from the exhaust to the coolant, thereby resulting in coolant overheating. In order to provide desired mitigating action, each coolant temperature sensor is diagnosed separately to determine which of the coolant temperature sensors is degraded.

While operating the EGHR system in the first mode, a coolant temperature may be measured upstream of the heat exchanger 176 via the first coolant temperature sensor 180, a coolant temperature upstream of the heat exchanger 176 may be modeled, and degradation of the first coolant temperature sensor 180 may be indicated responsive to a higher than threshold difference between the modeled coolant temperature upstream of the heat exchanger and the measured coolant temperature upstream of the heat exchanger. Similarly, a coolant temperature may be measured downstream of the heat exchanger 176 via the second coolant temperature sensor 182, a coolant temperature downstream of the heat exchanger may be modeled, and degradation of the second coolant temperature sensor 182 may be indicated responsive to a higher than threshold difference between the modeled coolant temperature downstream of the heat exchanger and the measured coolant temperature downstream of the heat exchanger 176. The modeled coolant temperature upstream of the heat exchanger 176 may be based on one or more of air flow between the heater core and the vehicle cabin and coolant flow from the engine to the heater core, and wherein the modeled coolant temperature downstream of the heat exchanger 176 is based on one or more of the modeled coolant temperature upstream of the heat exchanger 176, air flow between exhaust gas flowing through the heat exchanger 176 and coolant flowing through the heat exchanger 176, and coolant flow from the heater core to the heat exchanger. Details of the diagnostics process for the first coolant temperature sensor 180 coupled to coolant inlet 160 is discussed with reference to FIG. 6 and the details of the diagnostics process for the second coolant temperature sensor 182 coupled to coolant outlet 162 is discussed with reference to FIG. 7.

FIG. 1B shows a schematic view 120 of operation of the EGHR system 150 in a second operating mode. Components previously introduced in FIG. 1A are numbered similarly and not reintroduced.

As such, the second operating mode represents a second setting of the diverter valve 175 that enables exhaust flow control. In the second operating mode, the diverter valve 175 may be in the second (fully closed) position to disable exhaust flow from the main exhaust passage 102 to the bypass passage 174. In the second mode, exhaust may directly flow from the catalyst 171 to the muffler 172 bypassing the heat exchanger 176. As exhaust does not flow via the heat exchanger 176, exhaust heat may not be recovered at the heat exchanger.

The EGHR system 150 may be operated in the second operating mode (as described above) after engine warm-up and vehicle cabin warm-up has been completed and when exhaust heat is no longer desired for engine and/or vehicle cabin heating purposes. During operation in this mode, as exhaust heat recovery by the coolant is not carried out, the coolant temperature upstream of the heat exchanger may be equal to the coolant temperature downstream of the heat exchanger and therefore diagnostics of each of the coolant temperature sensors 180 and 182 may not be carried out. In one example, during operation of the EGHR system 150 in the second mode, the controller may send a signal to the actuator of the auxiliary pump 81 to stop the operation of the pump, thereby disabling coolant flow via each of the coolant inlet line 160, the coolant outlet line 162, and the heat exchanger.

In one example, during operation of the EGHR system 150 in the first mode, the diverter valve 175 may be maintained in a fully open position until the temperature of coolant entering the heat exchanger 176 reaches a third threshold temperature. The third threshold temperature may be higher than the first threshold temperature but lower than the second threshold temperature (third threshold temperature in between the first threshold temperature and the second threshold temperature). In response to the temperature of coolant entering the heat exchanger 176 reaching the third threshold temperature, it may be inferred that a lower rate of heat transfer is desired from the exhaust to the coolant. In order to lower the rate of heat transfer from the exhaust to the coolant, the position of the diverter valve 175 may be adjusted to a third, partially open position, wherein a first portion of exhaust may enter the bypass passage 174 and flow via the heat exchanger 176 while a second, remaining portion of exhaust may directly flow from the catalyst 171 to the muffler 172 via the exhaust passage 102. In this way, the EGHR system 150 may be operated in a third mode with the diverter valve in a third, partially open position. The controller may determine a position of the diverter valve based on a difference between the temperature of coolant entering the heat exchanger 176 and the second threshold temperature. For example, the controller may refer a look-up table having the difference between the temperature of coolant entering the heat exchanger 176 and the second threshold temperature as the input, and having a signal corresponding to a position of the diverter valve 175 as the output. As an example, with a decrease in difference between the temperature of coolant entering the heat exchanger 176 and the second threshold temperature, the opening of the diverter valve may be decreased to reduce the exhaust flow via the bypass passage 174 and the heat exchanger 176. Once the temperature of coolant entering the heat exchanger 176 reaches the second threshold temperature, it may be inferred that the engine temperature has reached an optimal operating temperature and heat is no longer extracted from the heater core for cabin heating purposes and the operation of the EGHR system 150 may be transitioned from the third mode to the second mode.

FIG. 2 shows an example embodiment 200 of an on-board heating, ventilation, and air conditioning (HVAC) system 5 (also referred herein as the coolant system) in a motor vehicle 6. Coolant system 5 circulates engine coolant and distributes recovered heat from an exhaust heat exchanger 54 through internal combustion engine 10 and the heater core 90. In one example, the coolant system 5 may be the HVAC system 155 and the exhaust heat exchanger 54 may be the heat exchanger 176 in FIGS. 1A-1B.

FIG. 2 shows coolant system 5 coupled to engine 10 and circulating engine coolant from engine 10, through exhaust heat exchanger 54 via the heater core 90, and to radiator 80 and/or radiator bypass line 87 via engine-driven (or electrical) water pump 86, and back to engine 10. The heat exchanger 54 may be a part of the exhaust heat recovery system 150 and exhaust from the main exhaust passage 102 may be routed to the heat exchanger 54 via bypass passage 174. Coolant from the engine may flow to the heater 90 via coolant line 89 and heat from the coolant may be transferred to the heater core 90. An auxiliary pump 75 may be coupled to the coolant line 89 to enable coolant flow via the heater core 90 and the heat exchanger 176. In one example, an evaporator may be coupled to the coolant line 89 upstream of the heater core. In one example, auxiliary pump 75 may be the auxiliary pump 81 as shown in FIGS. 1A-1B. From the heater core, the coolant may be circulated to the heat exchanger 54 via the coolant inlet line 84. In one example, as engine coolant is circulated through the heat exchanger 54, heat from exhaust may be transferred to the engine coolant, and then the heated coolant (heated with the extracted exhaust heat) may be routed through the engine 10. Coolant from the heat exchanger may exit via the coolant outlet line 83 and may return to the engine 10. Heat from the engine coolant may be transferred to the engine 10 and/or then to the heater core 90, and the engine 10 (including cylinder walls and pistons) and vehicle cabin 4 may be heated using the heat drawn from the engine coolant. A first coolant temperature sensor 180 may be coupled to the coolant inlet line 84 to estimate temperature of coolant entering the heat exchanger and a second coolant temperature sensor 182 may be coupled to the coolant outlet line 83 to estimate temperature of coolant exiting the heat exchanger.

Water pump 86 may be coupled to the engine via front end accessory drive (FEAD) 37, and rotated proportionally to engine speed via belt, chain, etc. Specifically, water pump 86 circulates coolant through passages in the engine block, head, etc., to absorb engine heat, which is then transferred via the radiator 80 to ambient air as regulated by thermostat valve 38. In an example where pump 86 is a centrifugal pump, the pressure (and resulting flow) produced may be proportional to the crankshaft speed, which may be directly proportional to engine speed. The temperature of the coolant may be regulated by a thermostat valve 38, which may be kept closed until the coolant reaches a threshold temperature, thereby reducing the transfer of heat from radiator 80 to ambient air when closed.

After flowing through the engine 10, coolant may exit the engine via coolant line 82 and may flow through the radiator 80 or through radiator bypass line 87 as regulated via the thermostat valve 38 with flow being directed through radiator bypass line 87 during conditions when the engine temperature (coolant temperature) is below a threshold temperature.

A fan 93 may be coupled to radiator 80 in order to increase airflow through radiator 80 as needed to maintain coolant temperatures below a desired threshold. In some examples, fan speed may be controlled by the engine controller directly. Alternatively, fan 93 may be coupled to the engine and driven directly from it.

In one example, a climate control system 94 may be coupled to the vehicle cabin 4. The climate control system 94 may be a part of the heater core and heat from the heater core may be used for cabin heating via the climate control system 94. The operator may specify a desired cabin temperature via input to dashboard switch coupled to the climate control system 94. The climate control system 94 may have vanes and/or door to allow air to circulate between the heater core 90 and the vehicle cabin 4. Based on the temperature settings and fan settings as specified by the operator, one or more of a speed of the fan (blower) and a position of the vanes and/or door may be adjusted. As an example, in response to an increase in cabin 4 heating demand, the controller may increase each of the speed of the fan and the opening of the vanes (such as a blend door at the inlet of the heater core) of the climate control system 94 to allow a higher amount of warm air to flow from the heater core 90 to the cabin 4. Similarly, in response to a decrease in cabin 4 heating demand, the controller may decrease the opening of the vanes of the climate control system 94 to reduce flow of warm air from the heater core 90 to the cabin 4.

In this way, the systems of FIGS. 1A-1B, 2 enable a system for a vehicle comprising: an engine: a vehicle cabin, an engine intake manifold, an engine exhaust system including an exhaust passage and a bypass passage, the exhaust passage including one or more exhaust catalysts and a muffler, the bypass passage coupled to the exhaust passage from downstream of the one or more exhaust catalysts to upstream of the muffler, the bypass passage including a heat exchanger, a diverter valve coupling an inlet of the bypass passage to the exhaust passage, a diverter valve position sensor coupled to the diverter valve, a coolant system with an incoming coolant line and an outgoing coolant line for circulating coolant through the heat exchanger, the coolant system further coupled to each of an engine block and a heater core of a heating, ventilation and air conditioning (HVAC) system, the incoming coolant line including a first coolant temperature sensor for estimating a coolant temperature upstream of the heat exchanger, the outgoing coolant line including a second coolant temperature sensor for estimating a coolant temperature downstream of the heat exchanger. The vehicle system further comprising a controller with computer readable instructions stored on non-transitory memory for performing the following while operating in a first mode: shifting the diverter valve to a first position to operate the exhaust system in the first mode with exhaust flowing from downstream of the exhaust catalyst to upstream of the muffler via the heat exchanger; and measuring a coolant temperature upstream of the heat exchanger via the first coolant temperature sensor, indicating degradation of the first coolant temperature sensor responsive to a higher than threshold difference between a modeled coolant temperature upstream of the heat exchanger and the measured coolant temperature upstream of the heat exchanger, and responsive to the indication of degradation, using the modeled temperature to estimate coolant temperature upstream of the heat exchanger.

Figure 5:
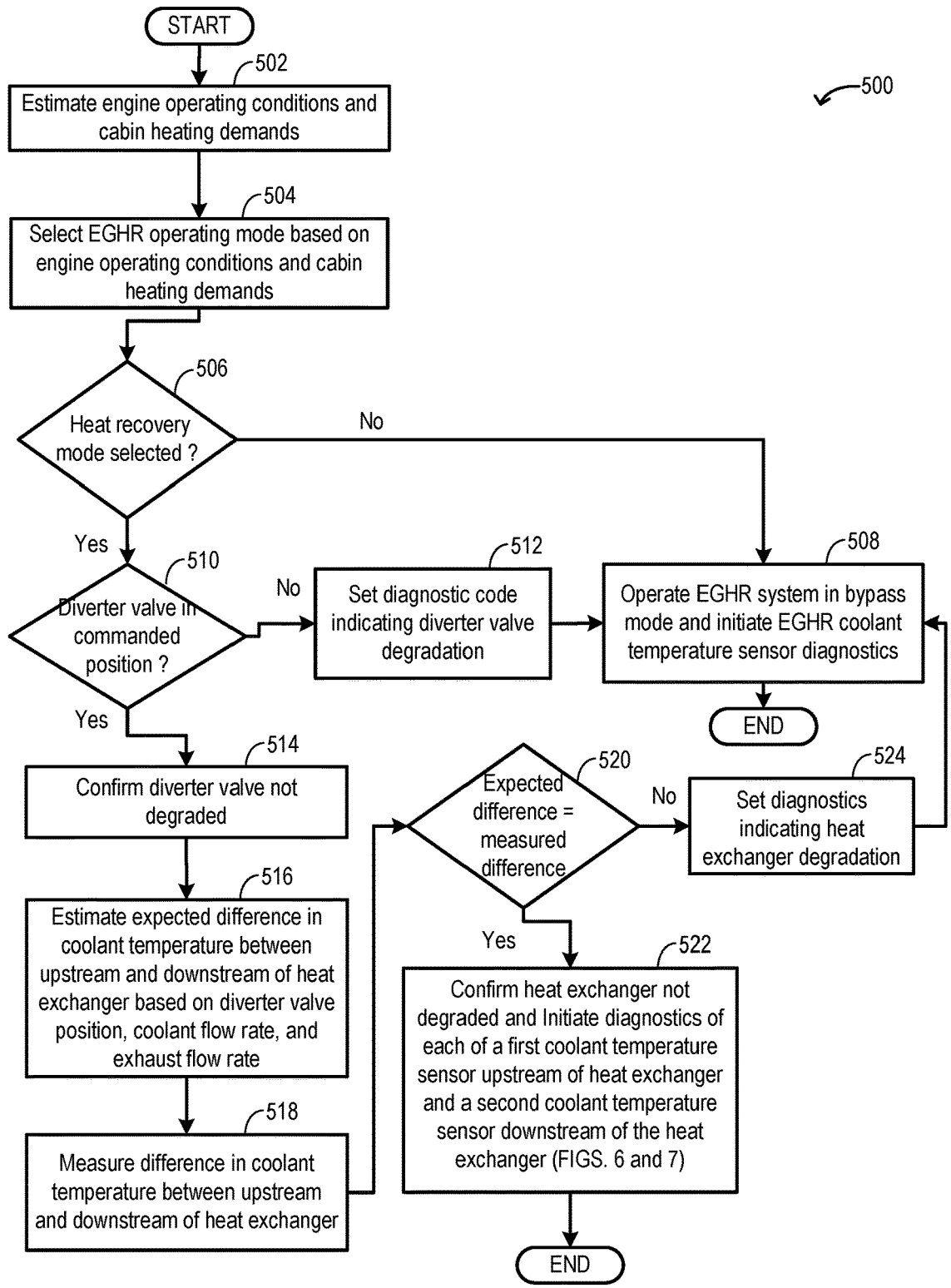
FIG. 5 shows a flow chart illustrating an example method that may be implemented for diagnostics of the EGHR system diverter valve and heat exchanger.

FIG. 5 illustrates an example method 500 illustrating an example method that may be implemented for diagnostics of an exhaust gas heat recovery (EGHR) system (such as EGHR system 150 of FIGS. 1A-1B) components including a diverter valve (such as diverter valve 175 of FIGS. 1A-1B) coupled to a junction of a main exhaust passage and an exhaust bypass passage housing a heat exchanger, and the heat exchanger (such as heat exchanger 176 of FIGS. 1A-1B). Instructions for carrying out method 500 and the rest of the methods included herein may be executed by a controller based on instructions stored on a memory of the controller and in conjunction with signals received from sensors of the engine system, such as the sensors described above with reference to FIGS. 1A-1B. The controller may employ engine actuators of the engine system to adjust engine operation, according to the methods described below.

At 502, the routine includes estimating and/or measuring engine operating conditions. Conditions assessed may include, for example, engine temperature, engine load, driver torque demand, engine speed, throttle position, exhaust pressure, exhaust air/fuel ratio, ambient conditions including ambient temperature, pressure, and humidity, MAP, MAF, boost, etc. The controller may also determine current vehicle cabin heating demands such as if cabin heating has been requested by the operator, such as during lower ambient temperature conditions. The operator may request cabin heating via input to a switch of the vehicle climate control system coupled to the vehicle cabin and the heater core of the heating, ventilation, and air conditioning (HVAC) system.

At 504, the controller may select an operating mode of the EGHR system based on the determined engine operating conditions and the cabin heating demand. Selecting the operating mode includes determining if engine heating is required based on engine temperature, ambient temperature, and/or exhaust catalyst temperature and/or if cabin heating has been requested. As an example, engine heating is desired during conditions when the engine temperature is low (e.g., below the activation temperature of an exhaust catalyst), such as during an engine cold-start condition. The heat exchange system may be operated in one of a plurality of modes by adjusting a position of the diverter valve coupled to a junction of the main exhaust passage and a bypass passage (such as bypass passage 174 in FIGS. 1A-1B) housing the heat exchanger. The position of the diverter valve may be adjusted to attain a desired engine coolant temperature and then to maintain the desired coolant temperature. In one example, exhaust heat recovery for engine heating may be desired when the temperature of coolant exiting the heat exchanger, as estimated via the coolant temperature sensor (such as the second coolant temperature sensor 182 of FIGS. 1A-1B) coupled to the coolant outlet downstream of the heat exchanger, is lower than a first threshold temperature. The first threshold may correspond to an engine warm-up temperature and the first threshold may be calibrated during engine operation based on the activation temperature of the exhaust catalyst. In another example, exhaust heat recovery for vehicle cabin heating may be desired when the temperature of coolant entering the heat exchanger, as estimated via the coolant temperature sensor (such as the first coolant temperature sensor 180 of FIGS. 1A-1B) coupled to the coolant inlet upstream of the heat exchanger, is lower than a second threshold coolant temperature. The second threshold coolant temperature may be calibrated based on each of an actual cabin temperature as estimated via a cabin temperature sensor and a desired cabin temperature as specified by the operator. In this way, the operating mode of the EGHR system may be selected based on input from at least one of the first coolant temperature sensor coupled upstream of the heat exchanger and the second coolant temperature sensor coupled downstream of the heat exchanger. As noted herein, such methods that include determining whether a certain condition is present and performing actions in response thereto may include operating in that condition, and determining whether that condition is present and performing actions in response thereto, as well as operating without that condition present, determining that the condition is not present, and performing a different action in response thereto.

At 506, the routine includes determining if the exhaust heat recovery mode ($1^{st}$ mode) has been selected. The exhaust heat exchange system may be operated in the first mode during cold start conditions when exhaust heat recovery for engine and vehicle cabin heating is desired. As such, exhaust heat recovery for engine heating may be desired until the coolant temperature downstream of the heat exchanger reaches the first coolant temperature and exhaust heat recovery for cabin heating may be desired until the coolant temperature upstream of the heat exchanger reaches the second coolant temperature. In order to operate the EGHR system in the first, exhaust heat recovery mode (as discussed in relation to FIG. 1A), the controller may send a signal to the diverter valve to actuate the diverter valve to a first, open position to enable the entire volume of exhaust to flow from the main exhaust passage to the tailpipe via the bypass passage housing the heat exchanger. In the exhaust heat recovery mode, based on engine heating and cabin heating demands, the diverter valve may be partially open to allow a portion of exhaust to enter the bypass passage and flow via the heat exchanger while the remaining portion of exhaust may be routed directly from the exhaust catalyst to the tailpipe bypassing the heat exchanger. In one example, if the difference between the first threshold coolant temperature and coolant temperature downstream of the heat exchanger increases, the opening of the diverter valve may be increased to allow an increased amount of exhaust to flow via the heat exchanger, thereby increasing exhaust heat recovery for engine heating. In another example, if the difference between the first threshold coolant temperature and coolant temperature downstream of the heat exchanger decreases, the opening of the diverter valve may be decreased to allow a decreased amount of exhaust to flow via the heat exchanger, thereby decreasing exhaust heat recovery for engine heating. Similarly, if the difference between the second threshold coolant temperature and coolant temperature upstream of the heat exchanger increases, the opening of the diverter valve may be increased to allow an increased amount of exhaust to flow via the heat exchanger, thereby increasing exhaust heat recovery for cabin heating and if the difference between the second threshold temperature and coolant temperature upstream of the heat exchanger decreases, the opening of the diverter valve may be decreased to allow a decreased amount of exhaust to flow via the heat exchanger, thereby decreasing exhaust heat recovery for cabin heating.

If it is confirmed that the heat recovery mode has been selected for operation of the EGHR system, at 510, the routine includes determining if the diverter valve is in the commanded position. Since the first mode of operation is selected for the EGHR system, the commanded position may be the first, open position. The actual position of the diverter valve may be determined based on input from the diverter valve position sensor (such as position sensor 32 in FIGS. 1A-1B). The actual position of the diverter valve may be compared to the commanded position (such as the first position). In one example, during operation in the heat recovery mode, the diverter valve may be commanded to a partially open position to allow a portion of exhaust to enter the bypass passage. During such a condition, the controller may determine if the actual position of the diverter valve is same as the commanded partially open position.

If it is confirmed that the diverter is not in the commanded position, such as if the diverter valve is stuck in a closed position or a partially open position that is different from the commanded position, at 512, a diagnostic code may be set indicating that the diverter valve has degraded. Since the diverter valve is degraded, it may not be possible to regulate the opening of the diverter valve to flow at least a portion of exhaust via the heat exchanger. In response to detection of degradation of the diverter valve, at 508, the EGHR system may be operated in the bypass mode with the diverter valve actuated to a second, completely closed position. In the completely closed position, exhaust may not enter the bypass passage housing the heat exchanger and may directly flow to the tailpipe from downstream of the exhaust catalyst. In one example, during operation of the EGHR system in the second, bypass mode, since exhaust does not flow via the heat exchanger, diagnostics of the coolant temperature sensor may not be carried out. In another example, even during EGHR operation in the second, bypass mode, diagnostics of each of the first coolant temperature sensor, (upstream of the heat exchanger) and the second coolant temperature sensor (downstream of the heat exchanger) may be carried out. Details of the diagnostics of the first coolant temperature sensor is discussed in relation to FIG. 6 and the details of the diagnostics of the second coolant temperature sensor is discussed in relation to FIG. 7.

If at 506 it is determined that the heat recovery mode is not selected for operation of the EGHR system, it may be inferred that due to lower engine heating and/or cabin heating demands, exhaust heat recovery at the heat exchanger is no longer desired. In one example, exhaust heat recovery for engine heating may no longer be desired when the temperature of coolant exiting the heat exchanger, as estimated via the coolant temperature sensor coupled to the coolant outlet downstream of the heat exchanger, is higher than the first threshold temperature. In another example, exhaust heat recovery for vehicle cabin heating may no longer be desired when the temperature of coolant entering the heat exchanger, as estimated via the coolant temperature sensor coupled to the coolant inlet upstream of the heat exchanger, is higher than the second threshold coolant temperature. Therefore, the routine may proceed to 508 in order to operate the EGHR system in the bypass mode.

If it is confirmed that the system is not operating in the exhaust heat recovery mode, at 506, it may be inferred that the EGHR system is operating in the bypass mode ($2^{nd}$ mode). The EGHR system may be operated in the bypass mode when there is no longer any demand for engine heating and/or vehicle cabin heating. In the second, bypass mode (as discussed in relation to FIG. 1B), the exhaust heat exchange system is operated with the diverter valve commanded to a second, closed position to disable exhaust from entering the bypass passage from the main exhaust passage. In the bypass mode, since exhaust does not flow via the heat exchanger, heat may not be transferred from the exhaust to the coolant flowing through the heat exchanger.

In one example, while operating the EGHR system in the bypass mode, diagnostics of the diverter valve may be carried out based on input from the diverter valve position sensor. In the bypass mode, the controller may command the diverter valve to be actuated to a fully closed position. If it is determined that the actual position of the diverter valve (determined based on input from the diverter valve position sensor) is different from the commanded fully closed position, it may be inferred that the diverter valve is stuck in a partially open or a completely open position and a diagnostics code may be set indicating degradation of the diverter valve.

If at 510, it is confirmed that the diverter valve is in the commanded first, open position, at 514, it may be confirmed that the diverter valve is not degraded and diagnostics of the heat exchanger may be initiated. At 516, the controller may estimate an expected difference in coolant temperature between upstream and downstream of the heat exchanger. As the coolant flows through the heat exchanger, exhaust heat is transferred to the coolant which results in an increase in coolant temperature. The difference in coolant temperature between upstream and downstream of the heat exchanger may be a function of diverter valve position, coolant flow rate, exhaust flow rate, and ambient temperature. As the diverter valve is actuated from a closed position (such as in the bypass mode) to an open position (such as in the heat recovery mode), the portion of the total exhaust amount flowing via the heat exchanger may be regulated. As such, as the total exhaust amount and the opening of the diverter valve increases, there may be a corresponding increase in exhaust flow rate via the heat exchanger. In one example, the controller may determine the exhaust flow rate via the heat exchanger based on a calculation using a look-up table with input being the total exhaust amount (total exhaust flow rate via the main exhaust passage) and the position (degree of opening) of the diverter valve and the output being the exhaust flow rate via the heat exchanger. The total exhaust amount (total exhaust flow rate via the main exhaust passage) may be determined based on input from an exhaust pressure sensor coupled to the main exhaust passage and the diverter valve position may be determined based on input from a diverter valve position sensor coupled to the diverter valve. The total exhaust amount also may be inferred from engine speed, load, ignition timing and EGR. The coolant flow rate may be determined based on output of the auxiliary pump (such as auxiliary pump 81 in FIGS. 1A-1B) or the engine driven coolant pump (such as pump 86 in FIG. 2) coupled to the coolant inlet line. As each of the exhaust flow rate via the heat exchanger and the coolant flow rate increases, there may be an increase in the amount of exhaust heat transfer to the coolant, thereby increasing the difference in coolant temperature between upstream and downstream of the heat exchanger. In one example, the controller may determine the expected difference in coolant temperature between upstream and downstream of the heat exchanger based on a calculation using a look-up table with the input being ambient temperature, coolant flow rate, exhaust temperature at the inlet of heat exchanger, and exhaust flow rate via the heat exchanger and the output being the difference in coolant temperature between upstream and downstream of the heat exchanger.

At 518, a difference in coolant temperature between upstream and downstream of the heat exchanger may be estimated based on inputs from the first coolant temperature sensor such as first coolant temperature sensor 180 of FIGS. 1A-1B) coupled to the coolant inlet line upstream of the heat exchanger and the second coolant temperature sensor such as first coolant temperature sensor 182 of FIGS. 1A-1B) coupled to the coolant outlet line downstream of the heat exchanger. The controller may retrieve the temperature estimation from each of the first and the second coolant temperature sensors and estimate the difference between coolant temperature downstream of the heat exchanger and the coolant temperature upstream of the heat exchanger.

At 520, the routine includes determining if the expected difference in coolant temperature between upstream and downstream of the heat exchanger is substantially equal to the estimated difference in coolant temperature between upstream and downstream of the heat exchanger. The controller may also determine if the expected difference in coolant temperature is within a specific error range of the estimated difference in coolant temperature. In one example, if there is degradation of the heat exchanger, such as if the heat exchanger is clogged, exhaust flow via the heat exchanger may be adversely affected resulting in lower than expected exhaust heat transfer from the exhaust to the coolant. Therefore, due to degradation of the heat exchanger, the coolant temperature downstream of the heat exchanger may not increase as expected due to the lower amount of exhaust heat recovery.

If it is determined that the expected difference in coolant temperature between upstream and downstream of the heat exchanger is substantially different (outside the error range) from the measured difference in coolant temperature between upstream and downstream of the heat exchanger, at 524, a diagnostic code may be set indicating degradation of the heat exchanger. If it is determined that the heat exchanger is degraded, exhaust heat recovery may no longer be effectively carried out and the routine may proceed to step 508 to operate the EGHR system in the bypass mode.

If is determined that the expected difference in coolant temperature between upstream and downstream of the heat exchanger is substantially equal to (or within the specific error range) the measured difference in coolant temperature between upstream and downstream of the heat exchanger, at 522, it may be confirmed that the heat exchanger is not degraded and diagnostics of each of the first coolant temperature sensor upstream of the heat exchanger and the second coolant temperature sensor downstream of the heat exchanger may be initiated. Details of the diagnostics of the first coolant temperature sensor is discussed in relation to FIG. 6 and the details of the diagnostics of the second coolant temperature sensor is discussed in relation to FIG. 7.

In this way, degradation of the heat exchanger may be indicated by the temperature difference of upstream and downstream coolant temperature sensors and correlating this with the diverter valve position and degradation of diverter valve functionality may be indicated by difference of measured and commanded valve position.

Figure 6:
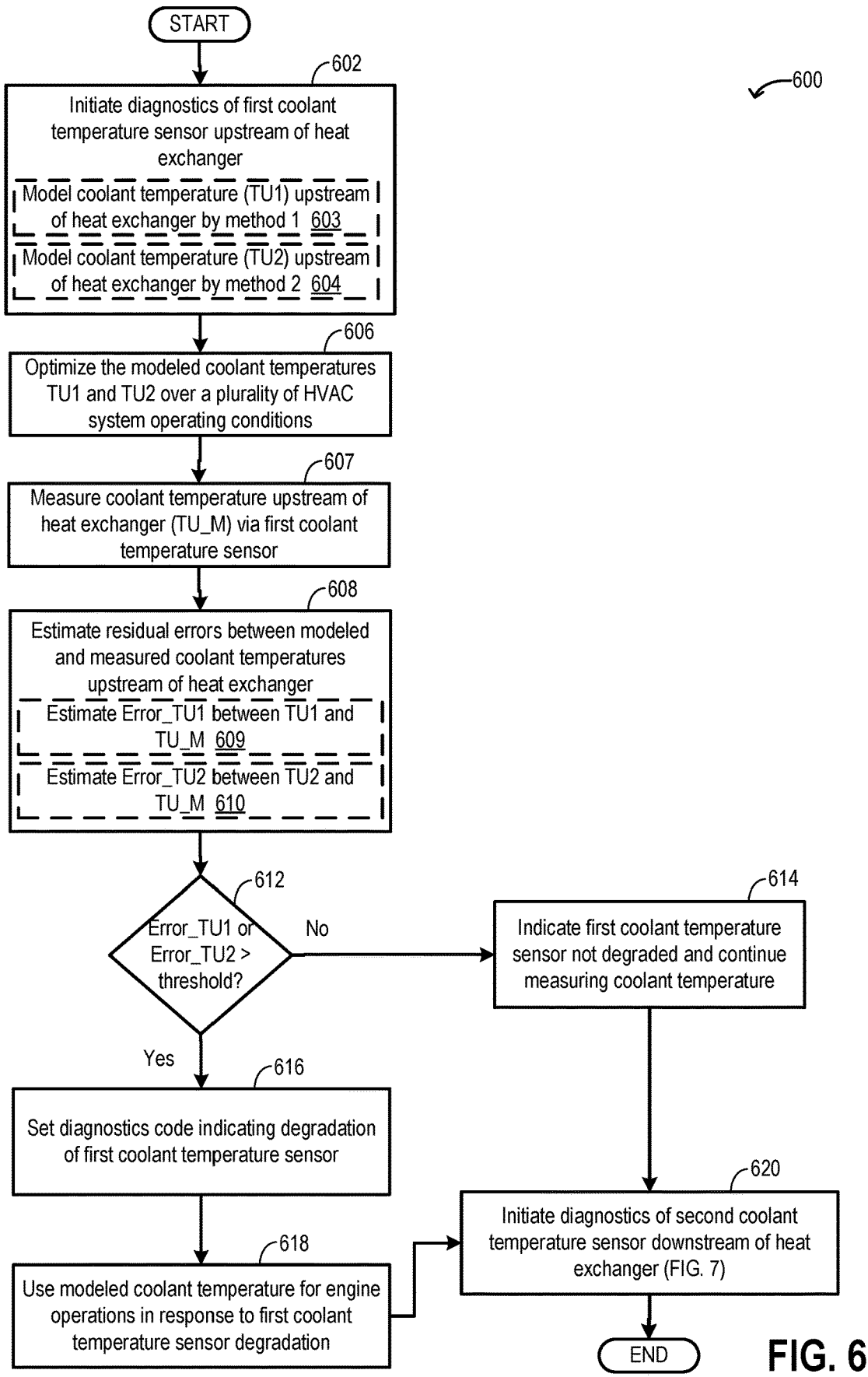
FIG. 6 shows a flow chart illustrating an example method that may be implemented for diagnostics of a coolant temperature sensor coupled upstream of a heat exchanger of the EGHR system.

FIG. 6 illustrates an example method 600 that may be implemented for diagnostics of a first coolant temperature sensor (such as first coolant temperature sensor 180 of FIGS. 1A-1B) coupled to a coolant inlet line upstream of a heat exchanger of the exhaust gas heat recovery (EGHR) system. Method 600 may be a part of the method 500 as described in FIG. 5 and may be carried out at 522 of the method 500.

At 602, diagnostics of the first coolant temperature sensor upstream of a heat exchanger may be initiated. The diagnostics may be carried out upon confirmation that the EGHR system is being operated in the exhaust heat recovery mode with the diverter valve at least partially open allowing at least a portion of exhaust to flow via the heat exchanger. In one example, the diagnostics may be triggered in response to a greater than threshold (calibratable) change in diverter valve position as the EGHR system is transitioned from operating in the bypass mode to the exhaust heat recovery mode. Also, the diagnostics may be initiated upon confirmation that the engine is operating in a steady state with stabilized engine operating conditions including engine speed and engine load. During transition in engine operation, there may be frequent changes in engine operating conditions which may affect the diagnostic procedure.

Diagnostics of the first coolant temperature sensor upstream of a heat exchanger include, at 603, modeling a first coolant temperature (TU1) upstream of the heat exchanger using a first computational method (referred herein as method 1). The modeled first coolant temperature as computed using the first method may be based on heat transfer between a heat loss source and a vehicle cabin (such as vehicle cabin 4 in FIG. 2). The heat loss source may include individual heat loss sources such as the heater core (such as heater core 90 in FIG. 2) of an on-board heating, ventilation, and air conditioning (HVAC) system and the coolant lines of the coolant system carrying coolant from the engine to the heater core and then to the heat exchanger of the EGHR system. By including the individual heat loss sources into a single heat loss source, exchange characteristics of each individual heat loss source may be condensed to a single time constant representing the entire system.

FIG. 3 shows an example schematic 300 of the modeling technique used in diagnostics of the coolant temperature sensor coupled upstream of an EGHR system heat exchanger. The heat loss source 302 may be fluidically coupled to the vehicle cabin 304 enabling air flow between the heat loss source 302 and the cabin 304. In one example, the heat loss source 302 may be fluidically coupled to ambient air and heat transfer may take place between the heat loss source 302 and ambient air. Coolant from engine 10 may enter the heat loss source and after flowing through the heat loss source, the coolant may exit the heat loss source and flow towards the heat exchanger of the EGHR system. In the first method, the first coolant temperature upstream of the heat exchanger may be computed using equation 1:

$$TU1 = T_{coolantin\_1} - (T_{coolantin_1} - T_{airin_1})e^{\frac{k_a \cdot m_{air_1}}{m_{coolant_1}}} \quad \text{EQ. 1}$$

wherein TU1 is the first coolant temperature upstream of the heat exchanger as computed by the first method, $T_{airin_1}$ is the temperature of air entering the heat exchanger (which may be ambient and/or a mixture of ambient with recirculated air from the climate control system), $T_{coolantin_1}$ is the temperature of coolant entering the heat loss source 302 from the engine, $m_{air\_1}$ is the mass air flow rate between the vehicle cabin 304 and the heat loss source 302, $m_{coolant\_1}$ is the mass coolant flow rate through the heat loss source 302, and k_a is the calibratable time constant of the combined heat loss source 302. $T_{airin_1}$ may be estimated based on input from one or more of a vehicle cabin temperature sensor (when the climate control system is operating), an ambient temperature sensor, and an evaporator outlet temperature sensor (coupled to the evaporator housed in the coolant line upstream of the heater core), and $T_{coolantin_1}$ may be estimated based on input from an engine coolant temperature sensor. $m_{air\_1}$ may be estimated as a function of the position of the blend door of the climate control system which allows air flow between the heat loss source 302 and the vehicle cabin and $m_{coolant\_1}$ may be estimated based on the speed of operation of the engine driven coolant pump (such as pump 86 in FIG. 2) regulating coolant flow via the coolant lines of the coolant system. In one example, the controller may determine $m_{air\_1}$ abased on a calculation using a look-up table with the input being the position of the blend door of the climate control system and total mass air flow from the evaporator and the output being $m_{air\_1}$. In another example, the controller may determine $m_{coolant\_1}$ abased on a calculation using a look-up table with the input being the speed of the coolant pump and the output being $m_{coolant\_1}$.

Diagnostics of the first coolant temperature sensor upstream of a heat exchanger include, at 604, modeling a first coolant temperature (TU2) upstream of the heat exchanger using a second computational method (referred herein as method 2). The modeled first coolant temperature as computed using the second method may be based on heat transfer between a heat loss source and a vehicle cabin. The heat loss source may include individual heat loss sources such as the heater core of the HVAC system and the coolant lines of the coolant system carrying coolant from the engine to the heater core and then to the heat exchanger of the EGHR system. The individual heat loss sources may be combined into one heat loss source by calibrating an effectiveness of heat transfer between the heat loss source 302 and the vehicle cabin 304.

In the second method, the first coolant temperature upstream of the heat exchanger may be computed using equation 2:

$$TU2 = T_{coolantin\_1} - \varepsilon 1 \cdot \frac{C_{min}}{C}(T_{cooantin\_1} - T_{airin\_1}) \qquad \text{EQ. 2}$$

wherein TU2 is the first coolant temperature upstream of the heat exchanger as computed by the second method, $T_{airin_1}$ is the temperature of air leaving the vehicle cabin 304 and entering the heat loss source 302, $T_{coolantin_1}$ is the temperature of coolant entering the heat loss source 302 from the engine, $C_{min}$ is the specific heat air, C is the specific heat of the coolant flowing through the heat loss source, and ε1 is the effectiveness of heat transfer between the heat loss source 302 and the vehicle cabin 304. In one example if the specific heat of coolant (C) is lower than the specific heat of air ($C_{min}$), then in equation 2, $C_{min}$ may be replaced by C. The specific heat of coolant (C) may be a function of the mass coolant flow rate through the heat loss source as estimated based on speed of the coolant system pump. Effectiveness of heat transfer (ε1) between the heat loss source 302 and the vehicle cabin 304 may be given by equation 3:

$$\varepsilon 1 = k_1 m_{coolant\_1} m_{air\_1} + k_2 m_{coolant\_1}^2 + k_3 m_{air\_1}^2 + k_4 m_{coolant\_1} + k_5 m_{air\_1} + k_6 \qquad \text{EQ. 3}$$

wherein ε1 is the effectiveness of heat transfer between the heat loss source and the vehicle cabin, $k_1, k_2, k_3, k_4, k_5$, and $k_6$ are calibratable coefficients representing the combined effectiveness of the system including the heat loss source and the vehicle cabin, $m_{air\_1}$ is the mass air flow rate between the vehicle cabin 304 and the heat loss source 302, and $m_{coolant\_1}$ is the mass coolant flow rate through the heat loss source 302.

In this way, the heat transfer between the heat loss source and the vehicle cabin is a function of one or more of a mass air flow rate between the heat loss source and the vehicle cabin, a temperature of coolant entering the heat loss source from the engine, a temperature of air entering the heat loss source from the vehicle cabin, a temperature of air entering the vehicle cabin from the heat loss source, and an effectiveness of heat transfer between the heat loss source and the vehicle cabin, the effectiveness of heat transfer between the heat loss source and the vehicle cabin based on each of the mass air flow rate between the heat loss source and the vehicle cabin and a mass coolant flow rate via the heat loss source.

Once the first coolant temperature upstream of the heat exchanger is computed using each of the two computational models, at 606, the modeled coolant temperatures TU1 and TU2 may be optimized over a plurality of HVAC system operating conditions in order to obtain a steady state coolant temperature upstream of the heat exchanger. TU1 and TU2 may be computed for a plurality of HVAC system operating conditions such as at different temperature settings of the vehicle cabin. Based on conditions such as ambient temperature, the operator may request a different temperature at the vehicle cabin. Based on the requested temperature and also setting of the fan coupled to the climate control system, the amount of heat transfer from the heat loss source (including the heater core) to the vehicle cabin may change.

The heat loss from the coolant flowing through the heat loss source may vary based on the HVAC system operating condition. In one example, during cold weather conditions, the operator may request for maximum heat supply with increased fan speed to supply an increased amount of warm air to the vehicle cabin, thereby increasing the mass air flow rate between the vehicle cabin and the heat loss source. In another example, after cabin warm-up, the operator may reduce the fan speed to maintain a lower, steady supply of warm air to the vehicle cabin, thereby decreasing the mass air flow rate between the vehicle cabin and the heat loss source. In yet another example, during warm weather conditions, the operator may not request any heat supply to the vehicle cabin, thereby further lowering the mass air flow rate between the vehicle cabin and the heat loss source. A rolling average time filter may be applied to obtain the optimized steady state first coolant temperature upstream of the heat exchanger, the optimized first coolant temperature given by equation 4:

$$TU1(t) = \text{rolledaverage}(T01_{ss}(t), T01_{ss}(t-1), t_c) \qquad \text{EQ. 4}$$

wherein TU1(t) is the modeled first coolant temperature as computed using the first method at a time t, $T01_{ss}(t)$ is the steady state modeled first coolant temperature as computed using the first method at a time t, $T01_{ss}(t-1)$ is the modeled first coolant temperature as computed using the first method at a time t−1, and $t_c$ is the time constant for a first order low-pass filter of each of the modeled first coolant temperature at a time t and the modeled first coolant temperature at a time t−1. Equation 4 may also be used for obtaining an optimized first coolant temperature (TU2) as computed using the second method.

At 607, the coolant temperature upstream of heat exchanger may be measured via the first coolant temperature sensor coupled to the coolant inlet line. At 608, a first residual error between the measured coolant temperature (TU_M) upstream of the heat exchanger and the modeled first coolant temperature upstream of the heat exchanger may be estimated. Estimating the residual error includes, at 609, estimating an error (Error_TU1) between the measured coolant temperature (TU_M) upstream of the heat exchanger and the modeled coolant temperature (TU1) as computed using the first method using equation 5:

$$\text{Error\_}TU1 = TU\_M - TU1 \qquad \text{EQ. 5}$$

wherein Error_TU1 is the first error between the measured coolant temperature upstream of the heat exchanger and the modeled coolant temperature as computed using the first method, TU_M is the measured coolant temperature upstream of the heat exchanger, and TU1 is the modeled coolant temperature upstream of the heat exchanger as computed using the first method.

Estimating the residual error further includes, at 610, estimating an error (Error_TU2) between the measured coolant temperature (TU_M) upstream of the heat exchanger and the modeled coolant temperature (TU2) as computed using the second method using equation 6:

$$\text{Error\_}TU2 = TU\_M - TU2 \qquad \text{EQ. 6}$$

wherein Error_TU2 is the second error between the measured coolant temperature upstream of the heat exchanger and the modeled coolant temperature as computed using the second method, TU_M is the measured coolant temperature upstream of the heat exchanger, and TU2 is the modeled coolant temperature upstream of the heat exchanger as computed using the second method.

At 612, the routine includes determining if Error_TU1 and/or Error_TU2 is higher than a threshold. The threshold may include a tolerance band with an upper limit and a lower limit. In one example, the tolerance band may have a tolerance of ±5° F. such as the upper limit of the tolerance band may be +5° F. and the lower limit of the tolerance band may be at −5° F. relative to a zero error.

If it is determined that Error_TU1 and/or Error_TU2 exceeds the upper limit or is below the lower limit of the tolerance band, at 616, degradation of the first coolant temperature sensor coupled to the coolant inlet line may be indicated.

In one example, every time Error_TU1 and/or Error_TU2 exceeds the upper limit or is below the lower limit of the tolerance band, the error is integrated with respect to time. The integrated error may be compared to a threshold error and in response to the integrated error for the coolant temperature upstream of the heat exchanger exceeding a threshold error, degradation of the first coolant temperature sensor coupled to the coolant inlet line may be indicated. In another example, the error, Error_TU1, between output of the first coolant temperature sensor upstream of the heat exchanger and the first modeled coolant temperature over a threshold time period may be accumulated. The accumulated error may be compared to a threshold error and in response to the accumulated error for the coolant temperature upstream of the heat exchanger exceeding a threshold error, degradation of the first coolant temperature sensor coupled to the coolant inlet line may be indicated. In yet another example, every time Error_TU1 and/or Error_TU2 exceeds the upper limit or is below the lower limit of the tolerance band, an increment may be added to a timer. The timer may be compared to a threshold time and in response to the timer exceeding the threshold time, degradation of the first coolant temperature sensor coupled to the coolant inlet line may be indicated.

Upon indication of degradation of the first coolant temperature sensor coupled to the coolant inlet line upstream of the heat exchanger, instead of relying upon the output of the degraded first coolant temperature sensor upstream of the heat exchanger for estimation of temperature of coolant entering the heat exchanger, until the first coolant temperature sensor has been serviced at 618, the modeled temperature (TU1 or 2) upstream of the heat exchanger may be used for engine operations. In one example, based on the modeled temperature of coolant entering the heat exchanger, a demand for engine heating and/or cabin heating may be estimated and the position of the diverter valve may be actuated based on the estimated engine heating and/or cabin heating demand. As such, if the modeled temperature of coolant entering the heat exchanger is lower than a threshold, it may be inferred that engine heating and/or cabin heating is desired and the diverter valve may be actuated to a fully open (first) position to enable the entire volume of exhaust to flow via the heat exchanger.

If it is determined the modeled temperature upstream of the heat exchanger is substantially equal to the measured coolant temperature or if the Error_TU1 and/or Error_TU2 is within the threshold tolerance band, at 614, it may be inferred that the first coolant temperature sensor upstream of the heat exchanger is not degraded and output from the first coolant temperature sensor may be continued to be used to estimate the temperature of coolant entering the heat exchanger.

In one example, the two methods for modeling the exhaust temperature upstream of the heat exchanger may be compared to determine which method provides a modeled coolant temperature upstream of the heat exchanger with higher accuracy. In order to compare the first modeling method to the second modeling method, the coolant temperature upstream of the heat exchanger (TU1) as modeled using the first method over a period of time may be used to fit the actual (measured) coolant temperature upstream of the heat exchanger over the same period of time (fit_U_1). Similarly, the coolant temperature upstream of the heat exchanger (TU2) as modeled using the second method over a period of time may be used to fit the actual (measured) coolant temperature upstream of the heat exchanger over the same period of time (fit_U_2). The quality of fit (fit_U_1) including the residual error between the modeled temperature (TU1) and the measured temperature may be compared to the quality of the fit_U_2 including the residual error between the modeled temperature (TU2) and the measured temperature. If it is inferred that the residual error for fit_U_1 is lower than the residual error for fit_U_2, it may be inferred that the coolant temperature upstream of the heat exchanger (TU1) as modeled using the first method may be more accurate compared to the coolant temperature upstream of the heat exchanger (TU1) as modeled using the second method. Similarly, If it is inferred that the residual error for fit_U_2 is lower than the residual error for fit_U_1, it may be inferred that the coolant temperature upstream of the heat exchanger (TU1) as modeled using the second method may be more accurate compared to the coolant temperature upstream of the heat exchanger (TU1) as modeled using the first method.

At 620, diagnostics of the second coolant temperature sensor coupled to a coolant outlet line downstream of a heat exchanger may be initiated at least partly based on the first modeled coolant temperature upstream of the heat exchanger. Details of the diagnostics of the second temperature sensor may be discussed with reference to FIG. 7.

Figure 7:
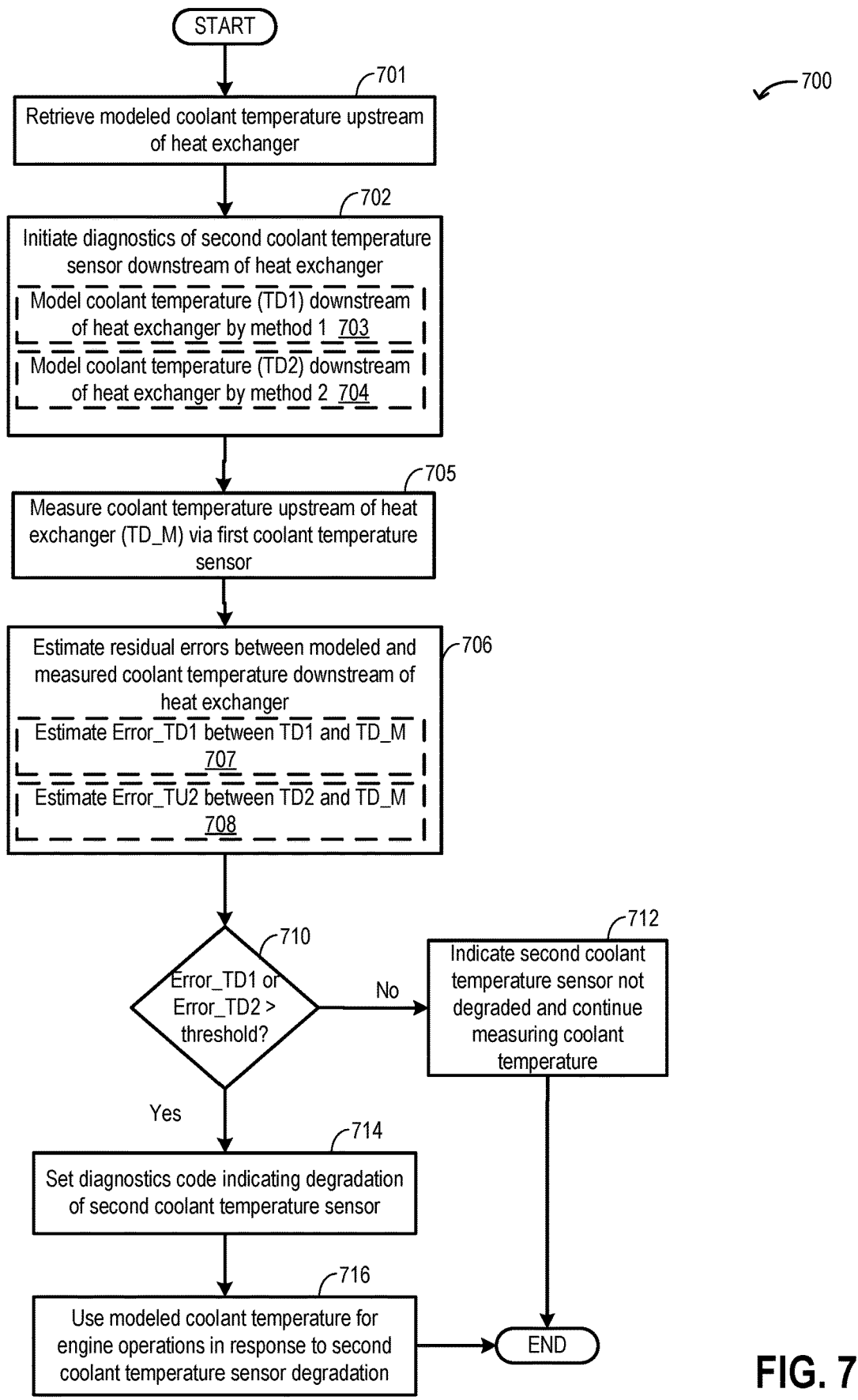
FIG. 7 shows a flow chart illustrating an example method that may be implemented for diagnostics of a coolant temperature sensor coupled downstream of the heat exchanger of the EGHR system.

FIG. 7 illustrates an example method 700 illustrating an example method that may be implemented for diagnostics of a second coolant temperature sensor (such as second coolant temperature sensor 182 of FIGS. 1A-1B) coupled to a coolant outlet line downstream of a heat exchanger of the exhaust gas heat recovery (EGHR) system. Method 700 may be a part of the method 500 as described in FIG. 5 and may be carried out at 522 of the method 500.

At 701, the modeled coolant temperature upstream of the heat exchanger (TU) may be retrieved. In one example, as described with reference to method 600 in FIG. 6, based on comparison of the modeled coolant temperature upstream of the heat exchanger computed using each of the first method and second method to the measured coolant temperature upstream of the heat exchanger, the computational method with the higher accuracy may be determined. If it is determined that the accuracy of the modeled coolant temperature upstream of the heat exchanger computed using the first method is higher than the accuracy of the modeled coolant temperature upstream of the heat exchanger computed using the second method, the modeled coolant temperature upstream of the heat exchanger computed using the first method may be retrieved and used for diagnostics of the second coolant temperature sensor. If it is determined that the accuracy of the modeled coolant temperature upstream of the heat exchanger computed using the second method is higher than the accuracy of the modeled coolant temperature upstream of the heat exchanger computed using the first method, the modeled coolant temperature upstream of the heat exchanger computed using the second method may be retrieved and used for diagnostics of the second coolant temperature sensor.

At 702, diagnostics of the second coolant temperature sensor downstream of a heat exchanger may be initiated. The diagnostics may be carried out upon confirmation that the EGHR system is being operated in the exhaust heat recovery mode with the diverter valve at least partially open allowing at least a portion of exhaust to flow via the heat exchanger. In one example, the diagnostics may be triggered in response to a greater than threshold (calibratable) change in diverter valve position as the EGHR system is transitioned from operating in the bypass mode to the exhaust heat recovery mode. Also, the diagnostics may be initiated upon confirmation that the engine is operating in a steady state with stabilized engine operating conditions including engine speed and engine load.

Diagnostics of the second coolant temperature sensor upstream of a heat exchanger include, at 703, modeling a second coolant temperature (TD1) downstream of the heat exchanger using a first computational method (referred herein as first method). The modeled second coolant temperature as computed using the first method may be based on heat transfer between exhaust flowing via the exhaust bypass passage (such as bypass passage 174 in FIGS. 1A-1B) and the heat exchanger (including coolant lines of the coolant system carrying coolant via the heat exchanger). By including the coolant lines of the coolant system carrying coolant via the heat exchanger and the heat exchanger as a single heat exchange source, exchange characteristics of each individual heat loss source may be condensed to a single time constant representing the entire system.

FIG. 4 shows an example schematic 400 of the modeling technique used in diagnostics of the coolant temperature sensor coupled downstream of an EGHR system heat exchanger. The heat exchanger 402 along with the coolant lines passing through the heat exchanger may be fluidically coupled to the exhaust bypass passage 404 enabling air flow between the exhaust flowing via the exhaust bypass passage 404 and the heat exchanger 402. Coolant from the heater core of the HVAC system (such as the heat loss source 302 in FIG. 3) may enter the heat exchanger via a coolant inlet line and after flowing through the heat exchanger may exit and flow towards the engine via the coolant outlet line. In the first method, the second coolant temperature downstream of the heat exchanger may be computed using equation 7:

$$TD1 = T_{coolantin\_2} + (T_{airin\_2} - T_{coolantin\_2})e^{\frac{k\_b \cdot m_{air\_2}}{m_{coolant\_2}}} \quad \text{EQ. 7}$$

wherein TD1 is the second coolant temperature downstream of the heat exchanger as computed by the first method, $T_{coolantin\_2}$ is the temperature of coolant entering the heat exchanger 402 from the heater core, $T_{airin\_2}$ is the temperature of air leaving the exhaust bypass passage 404 and entering the heat exchanger 402, $m_{air\_2}$ is the mass air flow rate between the exhaust bypass passage 404 and the heat exchanger 402, $m_{coolant\_2}$ is the mass coolant flow rate through the heat exchanger 402, and k_b is the calibratable time constant of the heat exchanger and the coolant lines passing through the heat exchanger. $T_{coolantin\_2}$ may be the modeled first coolant temperature (as retrieved in step 701) upstream of the heat exchanger. $T_{airin\_2}$ may be estimated based on an exhaust flow model or based on inputs from an exhaust flow sensor coupled to the exhaust passage. In one example, the $T_{airin\_2}$ may be estimated based on input from or an Air Conditioner (AC) evaporator temperature sensor. $M_{air\_2}$ may be estimated as a function of the diverter valve position and the total amount of exhaust flow via the main exhaust passage and $m_{coolant\_2}$ may be estimated based on the speed of operation of the engine driven coolant pump (such as pump 86 in FIG. 2) regulating coolant flow via the coolant lines of the coolant system. In one example, the controller may determine $m_{air\_2}$ based on a calculation using a look-up table with the input being each of the position of the diverter valve and the total amount of exhaust flow via the main exhaust passage and the output being $m_{air\_2}$. In another example, the controller may determine $m_{coolant\_2}$ based on a calculation using a look-up table with the input being the speed of the coolant pump and the output being $m_{coolant\_1}$. In yet another example, $m_{coolant\_2}$ may be based on the output of an auxiliary pump (such as auxiliary pump 81 in FIGS. 1A-1B) coupled to the coolant inlet line, $m_{coolant\_2}$ increasing with an increase in the output of the auxiliary pump, and $m_{coolant\_2}$ decreasing with a decrease in the output of the auxiliary pump.

Diagnostics of the second coolant temperature sensor downstream of a heat exchanger include, at 704, modeling a second coolant temperature (TD2) downstream of the heat exchanger using a second computational method (referred herein as the second method). The modeled second coolant temperature as computed using the second method may be based on heat transfer between exhaust flowing through the exhaust bypass passage and the coolant flowing through the heat exchanger.

In the second method, the first coolant temperature downstream of the heat exchanger may be computed using equation 8:

$$TD2 = T_{coolantin\_2} + \varepsilon 2 \cdot \frac{c_{min}}{c}(T_{airin\_2} - T_{coolantin\_2}) \quad \text{EQ. 8}$$

wherein TD2 is the second coolant temperature downstream of the heat exchanger as computed by the second method, $T_{airin\_2}$ is the temperature of air leaving the exhaust bypass passage 404 and entering the heat exchanger 402, $T_{coolantin\_2}$ may be the modeled first coolant temperature (as retrieved in step 701) upstream of the heat exchanger, $C_{min}$ is the specific heat of exhaust gas, C is the specific heat of the coolant flowing through the heat exchanger, and ε2 is the effectiveness of heat transfer between the exhaust bypass passage 404 and the heat exchanger 402. In one example if the specific heat of coolant (C) is lower than the specific heat of exhaust gas ($C_{min}$), then in equation 8, $C_{min}$ may be replaced by C. Effectiveness of heat transfer (ε2) between the exhaust bypass passage and the heat exchanger may be given by equation 9:

$$\varepsilon 2 = c_1 m_{coolant\_2} m_{air\_2} + c_2 m_{coolant\_2}^2 + c_3 m_{air\_2}^2 + c_4 m_{coolant\_2} + c_5 m_{air\_2} + c_6 \quad \text{EQ. 9}$$

wherein ε2 is the effectiveness of heat transfer between the exhaust bypass passage and the heat exchanger, $c_1$, $c_2$, $c_3$, $c_4$, $c_5$, and $c_6$ are calibratable coefficients representing the combined effectiveness of the EGHR system including the heat exchanger, the coolant lines through the heat exchanger and the exhaust bypass passage, $m_{air\_2}$ is the mass exhaust flow rate through the heat exchanger 402, $m_{coolant\_2}$ is the mass coolant flow rate through the heat exchanger 402.

In this way, the heat transfer between the exhaust gas and the coolant in the heat exchanger is a function of one or more of a mass exhaust flow rate through the heat exchanger, a temperature of coolant entering the heat exchanger, a temperature of air entering the heat exchanger from the exhaust gas, a temperature of air entering the exhaust gas from the heat exchanger, and an effectiveness of heat transfer between the exhaust gas and the coolant flowing through the heat exchanger, the effectiveness of heat transfer between the exhaust gas and the coolant flowing through the heat exchanger based on each of the mass air flow rate between the exhaust gas and a mass coolant flow rate via the heat exchanger.

At 705, the coolant temperature downstream of the heat exchanger (TD_M) may be measured via the second coolant temperature sensor coupled to the coolant outlet line. At 706, a first residual error between the measured coolant temperature (TD_M) downstream of the heat exchanger and the modeled second coolant temperature downstream of the heat exchanger may be estimated. Estimating the residual error includes, at 707, estimating an error (Error_TD1) between the measured coolant temperature (TD_M) downstream of the heat exchanger and the modeled coolant temperature (TD1) as computed using the first method, using equation 10.

$$\text{Error\_}TD1=TD\_M-TD1 \qquad \text{EQ. 10}$$

wherein Error_TD1 is the first error between the measured coolant temperature downstream of the heat exchanger and the modeled coolant temperature as computed using the first method, TD_M is the measured coolant temperature downstream of the heat exchanger, and TD1 is the modeled coolant temperature downstream of the heat exchanger as computed using the first method.

Estimating the residual error further includes, at 708, estimating an error (Error_TD2) between the measured coolant temperature (TD_M) downstream of the heat exchanger and the modeled coolant temperature (TD2) as computed using the second method, using equation 11.

$$\text{Error\_}TD2=TD\_M-TD2 \qquad \text{EQ. 11}$$

wherein Error_TD2 is the second error between the measured coolant temperature downstream of the heat exchanger and the modeled coolant temperature as computed using the second method, TD_M is the measured coolant temperature downstream of the heat exchanger, and TD2 is the modeled coolant temperature downstream of the heat exchanger as computed using the second method.

At 710, the routine includes determining if Error_TD1 and/or Error_TD2 is higher than a threshold. The threshold may include a tolerance band with an upper limit and a lower limit. In one example, the tolerance band may have a tolerance of ±5° F. such as the upper limit of the tolerance band may be +5° F. and the lower limit of the tolerance band may be at −5° F. relative to a zero error.

If it is determined that Error_TD1 and/or Error_TD2 exceeds the upper limit or is below the lower limit of the tolerance band, at 714, degradation of the second coolant temperature sensor coupled to the coolant outlet line may be indicated.

In one example, every time Error_TD1 and/or Error_TD2 exceeds the upper limit or is below the lower limit of the tolerance band, the error is integrated with respect to time. The integrated error may be compared to a threshold error and in response to the integrated error for the coolant temperature downstream of the heat exchanger exceeding a threshold error, degradation of the second coolant temperature sensor coupled to the coolant outlet line may be indicated. In another example, the error, Error_TD1, between output of the second coolant temperature sensor downstream of the heat exchanger and the first modeled coolant temperature over a threshold time period may be accumulated. The accumulated error may be compared to a threshold error and in response to the accumulated error for the coolant temperature downstream of the heat exchanger exceeding a threshold error, degradation of the second coolant temperature sensor coupled to the coolant outlet line may be indicated. In yet another example, every time Error_TD1 and/or Error_TD2 exceeds either the upper limit or the lower limit of the tolerance band, an increment may be added to a timer. The timer may be compared to a threshold time and in response to the timer exceeding the threshold time, degradation of the second coolant temperature sensor coupled to the coolant outlet line may be indicated.

Upon indication of degradation of the second coolant temperature sensor coupled to the coolant inlet line upstream of the heat exchanger, instead of relying upon the output of the degraded second coolant temperature sensor downstream of the heat exchanger for estimation of a temperature of coolant exiting the heat exchanger, until the second coolant temperature sensor has been serviced at 716, the modeled temperature (TD1 or TD2) downstream of the heat exchanger may be used for engine operations. As such, exhaust heat recovery may be continued until the coolant temperature downstream of the heat exchanger reaches a desired coolant temperature (such as a coolant temperature corresponding to a warm engine). The position of the diverter valve may be actuated based on the modeled temperature (TD1 or 2) downstream of the heat exchanger. In one example, if the difference between the desired coolant temperature and coolant temperature downstream of the heat exchanger increases, the opening of the diverter valve may be increased to allow an increased amount of exhaust to flow via the heat exchanger, thereby increasing exhaust heat recovery. In another example, if the difference between the desired coolant temperature and coolant temperature downstream of the heat exchanger decreases, the opening of the diverter valve may be decreased to allow a decreased amount of exhaust to flow via the heat exchanger, thereby decreasing exhaust heat recovery.

If it is determined the modeled temperature downstream of the heat exchanger is substantially equal to the measured coolant temperature downstream of the heat exchanger or if the Error_TD1 and/or Error_TD2 is within the threshold tolerance band, at 712, it may be inferred that the second coolant temperature sensor downstream of the heat exchanger is not degraded and output from the second coolant temperature sensor may be continued to be used to estimate the temperature of coolant exiting the heat exchanger.

In one example, the two methods for modeling the exhaust temperature downstream of the heat exchanger may be compared to determine which of the two methods provide a modeled coolant temperature downstream of the heat exchanger with higher accuracy. In order to compare the first modeling method to the second modeling method, the coolant temperature downstream of the heat exchanger (TD1) as modeled using the first method over a period of time may be used to fit the actual (measured) coolant temperature downstream of the heat exchanger over the same period of time (fit_D_1). Similarly, the coolant temperature downstream of the heat exchanger (TD2) as modeled using the second method over a period of time may be used to fit the actual (measured) coolant temperature upstream of the heat exchanger over the same period of time (fit_D_2). The quality of fit_D_1 including the residual error between the modeled temperature (TD1) and the measured temperature may be compared to the quality of fit_D_2 including the residual error between the modeled temperature (TD2) and the measured temperature. If it is inferred that the residual error for fit_D_1 is lower than the residual error for fit_D_2, it may be inferred that the coolant temperature downstream of the heat exchanger (TD1) as modeled using the first method may be more accurate compared to the coolant temperature downstream of the heat exchanger (TD2) as modeled using the second method. Similarly, If it is inferred that the residual error for fit_D_2 is lower than the residual error for fit_D_1, it may be inferred that the coolant temperature downstream of the heat exchanger (TD2) as modeled using the second method may be more accurate compared to the coolant temperature downstream of the heat exchanger (TD1) as modeled using the first method.

Figure 8:
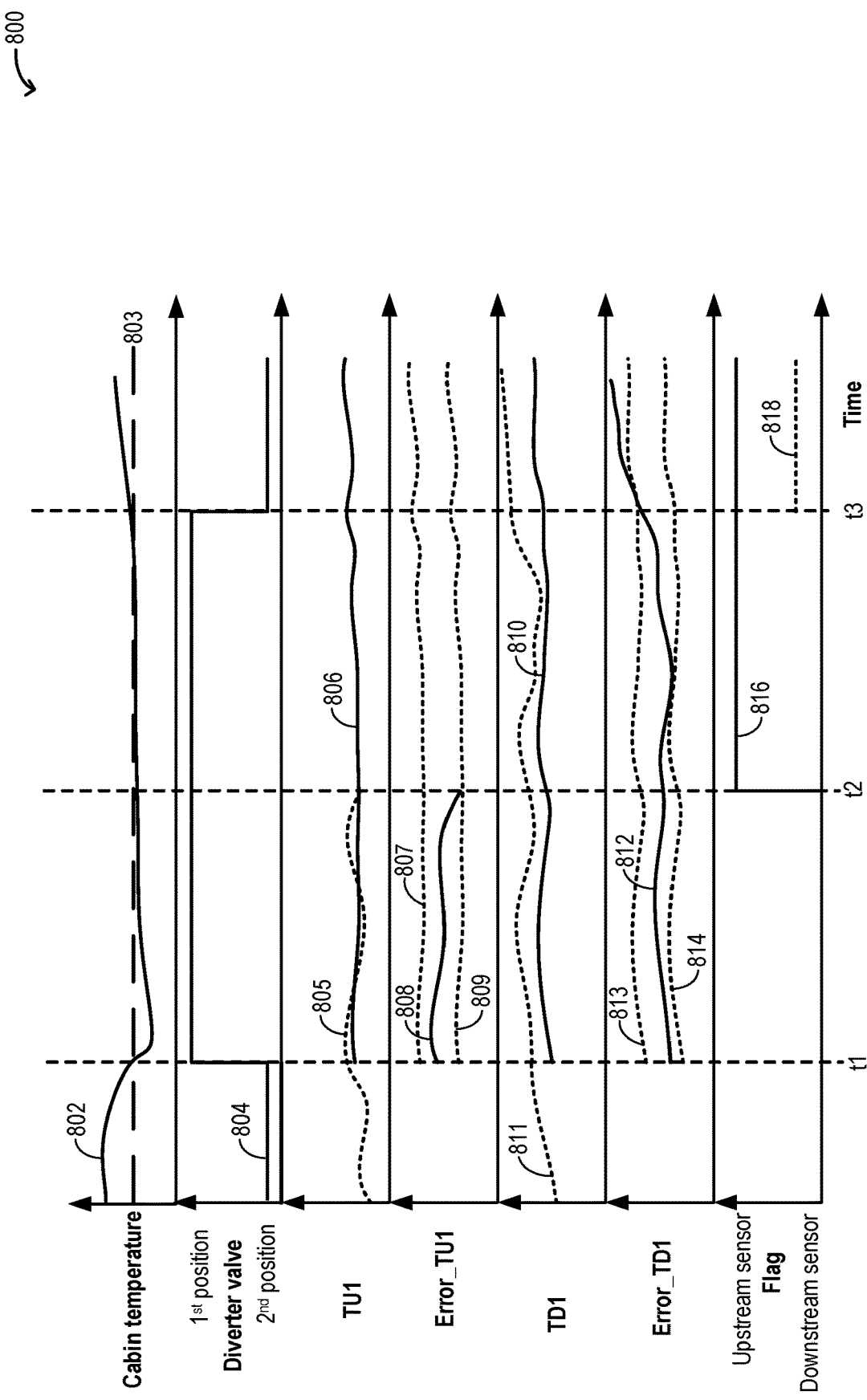
FIG. 8 shows an example diagnosing of coolant temperature sensors coupled to the EGHR system, according to the present disclosure.

In this way, during exhaust flow from a vehicle engine to a tailpipe via a heat exchanger having a coolant flowing therethrough, in response to a higher than threshold difference between output of a first coolant temperature sensor positioned upstream of the heat exchanger and a first modeled coolant temperature which is based in part on heat transfer between a heat loss source and a vehicle cabin, and in response to a higher than threshold difference between output of a second coolant temperature sensor positioned downstream of the heat exchanger and a second modeled coolant temperature which is based in part on the first modeled coolant temperature, degradation of one or more of the first and second coolant temperature sensors may be indicated. As an example, one or more of the first coolant temperature sensor, upstream of the heat exchanger and the second coolant temperature sensor, downstream of the heat exchanger may be removed and coolant temperature as modeled based on the approaches discussed in FIGS. 6-7 may be used for engine operations (instead of the sensed temperatures), thereby reducing engine components and the associated costs. FIG. 8 shows an example operating sequence 800 illustrating diagnostics of coolant temperature sensors coupled to an exhaust gas heat recovery (EGHR) system. The horizontal (x-axis) denotes time and the vertical markers t1-t3 identify significant times in the diagnostics of the coolant temperature sensors of the EGHR system.

The first plot, line 802, shows a variation in cabin temperature over time. Dashed line 803 shows a threshold cabin temperature below which cabin heating may be requested by the operator. The second plot, line 804, shows a position of the diverter valve, coupled to a junction of a main exhaust passage and an exhaust bypass passage, regulating exhaust flow from the main exhaust passage to the heat exchanger housed in the exhaust bypass passage. The third plot, line 806, shows a first modeled temperature upstream of the heat exchanger as computed using equation 1. Dotted line 805 shows a first measured coolant temperature upstream of the heat exchanger as estimated based on inputs from a first coolant temperature sensor coupled to the coolant inlet line upstream of the heat exchanger. The fourth plot, line 808, shows a difference (error_TU1) between the measured coolant temperature upstream of the heat exchanger (as given by dotted line 805) and the first modeled temperature upstream of the heat exchanger (as given by line 806). Dotted line 807 shows an upper limit of a threshold error range above which the first temperature sensor coupled upstream of the heat exchanger may be inferred to be degraded. Dotted line 809 shows a lower limit of the threshold error range below which the first temperature sensor coupled upstream of the heat exchanger may be inferred to be degraded. The fifth plot, line 810, shows a second modeled temperature downstream of the heat exchanger as computed using equation 7. Dotted line 811 shows a second measured coolant temperature downstream of the heat exchanger as estimated based on inputs from a second coolant temperature sensor coupled to the coolant outlet line downstream of the heat exchanger. The sixth plot, line 812, shows a difference (error_TD1) between the measured coolant temperature downstream of the heat exchanger (as given by dotted line 811) and the second modeled temperature downstream of the heat exchanger (as given by line 812). Dotted line 813 shows an upper limit of a threshold error range above which the second temperature sensor coupled downstream of the heat exchanger may be inferred to be degraded. Dotted line 814 shows a lower limit of the threshold error range below which the second temperature sensor coupled downstream of the heat exchanger may be inferred to be degraded. The seventh plot, line 816, shows a position of a diagnostic flag indicating health of the first coolant temperature sensor coupled upstream of the heat exchanger and dotted line 818 shows a position of a diagnostic flag indicating health of the second coolant temperature sensor coupled downstream of the heat exchanger.

Prior to time t1, the cabin temperature is higher than the threshold 803 and cabin heating is not requested. The diverter valve is maintained in the second, closed position to disable exhaust flow from the main exhaust passage to the heat exchanger via the diverter valve, thereby operating the EGHR system in the bypass mode. As the EGHR system is operated in the bypass mode, exhaust heat is not recovered by the heat exchanger and there is no appreciable difference in coolant temperature upstream and downstream of the heat exchanger. As exhaust heat recovery is not carried out during EGHR operation in the bypass mode, diagnostics of the coolant temperature sensors may not be carried out prior to time t1.

At time t1, the cabin temperature decreases to below the threshold due to the vehicle traveling through a region with cooler ambient temperature. In response to the decrease in cabin temperature, exhaust heat recovery is requested and the EGHR system is transitioned from operating in the bypass mode to operating in the exhaust heat recovery mode. In order to operate the EGHR system in the exhaust heat recovery mode, the diverter valve is actuated from a fully closed position to a fully open, first position enabling flow of exhaust from the main exhaust passage to the heat exchanger via the diverter valve.

As exhaust flows through the heat exchanger, exhaust heat is transferred from the exhaust to the coolant flowing through the heat exchanger. The coolant with the exhaust heat then flows through a heater core of the onboard on-board heating, ventilation and air conditioning (HVAC) system via the engine, and at the heater core, heat from the exhaust is transferred to the vehicle cabin thereby increasing cabin heat. After flowing through the heater core, the coolant returns to the heat exchanger of the EGHR system via the coolant inlet line. During operation of the EGHR system in the exhaust heat recovery mode, at time t1, diagnostics of each the first coolant temperature sensor coupled to the coolant inlet line upstream of the heat exchanger and the second coolant temperature sensor coupled to the coolant outlet line downstream of the heat exchanger is initiated. Between t1 and t2, based on heat transfer between a heater core and a vehicle cabin, a modeled coolant temperature (TU1) upstream of the heat exchanger is computed. Also, during this time, a modeled coolant temperature (TD1) downstream of the heat exchanger is computed based on heat transfer from the exhaust flowing through the exhaust bypass passage and the coolant flowing through the heat exchanger.

Between time t1 and t2, each of the temperature upstream of the of the heat exchanger and the temperature downstream of the heat exchanger are measured via the first coolant temperature sensor and the second coolant temperature sensor, respectively. The difference 808 (error_TU1) between the measured coolant temperature upstream of the heat exchanger and TU1 is compared to each of the upper limit 807 and the lower limit 809 of the threshold error range to detect any degradation of the first coolant temperature sensor. Between t1 and t2, error_TU1 remains within the threshold error range and the flag indicating degradation of the first coolant temperature sensor is maintained in the off position. The difference 812 (error_TD1) between the measured coolant temperature downstream of the heat exchanger and TU1 is compared to each of the upper limit 813 and the lower limit 814 of the threshold error range to detect any degradation of the second coolant temperature sensor. Between t1 and t2, error_TD1 remains within the threshold error range and the flag indicating degradation of the second coolant temperature sensor is maintained in the off position. Once the exhaust heat is being supplied to the vehicle cabin, the cabin temperature is observed to steadily increase.

At time t2, based on the error_TU1 808 decreasing to below the lower limit 809 of the threshold error range, it is inferred that there is a higher than threshold difference between the measured coolant temperature upstream of the heat exchanger and the modeled coolant temperature upstream of the heat exchanger. Based on the higher than threshold error_TU1, at t2, degradation of the first coolant temperature sensor is inferred and the flag (diagnostic code) 816 indicating the degradation of the first coolant temperature sensor is set. Responsive to the degradation of the first coolant temperature sensor, after time t2, coolant temperature upstream of the heat exchanger is inferred based on the modeled coolant temperature TU1 and the coolant temperature measurement based on input from the first coolant temperature sensor is suspended until the first coolant temperature sensor is serviced. Between t2 and t3, error_TD1 remains within the threshold error range and the flag indicating degradation of the second coolant temperature sensor is maintained in the off position.

At time t3, based on the error_TD1 812 increasing above the upper limit 813 of the threshold error range, it is inferred that there is a higher than threshold difference between the measured coolant temperature downstream of the heat exchanger and the modeled coolant temperature downstream of the heat exchanger. Based on the higher than threshold error_TD1, at t3, degradation of the second coolant temperature sensor is inferred and a flag (diagnostic code) 818 indicating the degradation of the second coolant temperature sensor is set. Responsive to the degradation of the second coolant temperature sensor, after time t3, coolant temperature downstream of the heat exchanger is inferred based on the modeled coolant temperature TD1 and the coolant temperature measurement based on input from the second coolant temperature sensor is suspended until the second coolant temperature sensor is serviced.

In this way, by opportunistically monitoring the health of EGHR system components including the coolant temperature sensors, the diverter valve, and the heat exchanger during distinct modes of operation of the EGHR system, degradation of individual components may be detected and suitable mitigating actions may be taken. The technical effect of using distinct mathematical models to compute coolant temperature upstream and downstream of a heat exchanger of the EGHR system is that degradation of a first coolant temperature sensor upstream of the heat exchanger may be differentiated from degradation of a second coolant temperature sensor downstream of the heat exchanger. By optimizing the modeled coolant temperature upstream of the heat exchanger over a plurality of HVAC system operating conditions, an accurate steady state coolant temperature may be obtained.

An example method comprises: during exhaust flow from a vehicle engine across a heat exchanger having a coolant flowing therethrough, in response to a higher than threshold difference between a measured coolant temperature and a modeled coolant temperature which is based on heat transfer between a heat loss source and a vehicle cabin, indicating degradation of one or more of a first and a second coolant temperature sensors respectively coupled upstream and downstream of the heat exchanger. In any preceding example, additionally or optionally, wherein the heat loss source includes a heater core and a plurality of coolant lines of an on-board heating, ventilation and air conditioning (HVAC) system. In any or all of the preceding examples, additionally or optionally, the measured coolant temperature includes a first measured coolant temperature upstream of the heat exchanger based on an input from the first coolant temperature sensor coupled to a coolant line entering the heat exchanger, the modeled coolant temperature includes a first modeled coolant temperature upstream of the heat exchanger, and indicating degradation of the first coolant temperature sensor coupled upstream of the heat exchanger is based on a higher than threshold difference between the first measured coolant temperature upstream of the heat exchanger and the first modeled coolant temperature upstream of the heat exchanger, the first modeled coolant temperature calibrated over a plurality of vehicle cabin heat settings. In any or all of the preceding examples, additionally or optionally, wherein the heat transfer between the heat loss source and the vehicle cabin is a function of one or more of a mass air flow rate between the heat loss source and the vehicle cabin, a temperature of coolant entering the heat loss source from the engine, a temperature of air entering the heat loss source from the vehicle cabin, a temperature of air entering the vehicle cabin from the heat loss source, and an effectiveness of heat transfer between the heat loss source and the vehicle cabin, the effectiveness of heat transfer between the heat loss source and the vehicle cabin based on each of the mass air flow rate between the heat loss source and the vehicle cabin and a mass coolant flow rate via the heat loss source. In any or all of the preceding examples, additionally or optionally, wherein the mass air flow rate between the heater core and the vehicle cabin is a function of a position of an air vent, the air vent allowing air flow between the heater core and the vehicle cabin. In any or all of the preceding examples, additionally or optionally, wherein the measured coolant temperature further includes a second measured coolant temperature downstream of the heat exchanger based on an input from the second coolant temperature sensor coupled to a coolant line exiting the heat exchanger, the modeled coolant temperature further includes a second modeled coolant temperature downstream of the heat exchanger, and indicating degradation of the second coolant temperature sensor coupled downstream of the heat exchanger is based on a higher than threshold difference between the second measured coolant temperature downstream of the heat exchanger and the second modeled coolant temperature of the heat exchanger, wherein the second modeled coolant temperature downstream of the heat exchanger is based on each of the first modeled coolant temperature upstream of the heat exchanger and heat transfer between exhaust gas and the heat exchanger. In any or all of the preceding examples, additionally or optionally, wherein the heat transfer between the exhaust gas and the coolant flowing through heat exchanger is a function of one or more of a mass exhaust flow rate via the heat exchanger, a temperature of coolant entering the heat exchanger, a temperature of air entering the heat exchanger from the exhaust gas, a temperature of air entering the exhaust gas from the heat exchanger, and an effectiveness of heat transfer between the exhaust gas and the coolant flowing through heat exchanger, the effectiveness of heat transfer between the exhaust gas and the coolant flowing through heat exchanger based on each of the mass air flow rate between the exhaust gas and the coolant flowing through heat exchanger and a mass coolant flow rate via the heat exchanger. In any or all of the preceding examples, wherein the mass exhaust flow rate via the heat exchanger is additionally or optionally, the mass exhaust flow rate via the heat exchanger is a function of each of a position of an exhaust diverter valve and a total exhaust flow rate via the main exhaust passage. Any or all of the preceding examples further comprising, additionally or optionally, in response to indication of degradation of the first coolant temperature sensor, using the first modeled coolant temperature for engine operations, and in response to indication of degradation of the second coolant temperature sensor, using the second modeled coolant temperature for engine operations. In any or all of the preceding examples, additionally or optionally, wherein the heat exchanger is coupled to an exhaust bypass, the method further comprising, adjusting the position of the exhaust diverter valve coupled to a junction of the exhaust bypass and a main exhaust passage to regulate exhaust flow via the heat exchanger to maintain a desired engine coolant temperature of an engine coolant which is in thermal communication with the coolant from the heat exchanger, the desired engine coolant temperature based on each of engine heating demand and vehicle cabin heating. Any or all of the preceding examples further comprising, additionally or optionally, indicating degradation of the diverter valve responsive to an actual position of the diverter valve as estimated based on input from a diverter valve position sensor differing from an expected position of the diverter valve, wherein the expected position of the diverter valve includes one of a first position during a higher than threshold engine heating demand and/or a higher than threshold vehicle cabin heating demand enabling exhaust flow via the heat exchanger and a second position during a lower than threshold engine heating demand and a lower than threshold vehicle cabin heating demand disabling exhaust flow via the heat exchanger. Any or all of the preceding examples further comprising, additionally or optionally, indicating degradation of the heat exchanger responsive to an expected temperature difference between coolant temperature upstream and downstream of the heat exchanger being different from an actual temperature difference between coolant temperature upstream and downstream of the heat exchanger, the expected temperature difference based on each of the actual position of the diverter valve, the mass coolant flow rate via the heat exchanger, and exhaust flow rate, and the actual difference based on inputs from the first coolant temperature sensor and the second coolant temperature sensor.

Another example method comprises: during exhaust flow from a vehicle engine to a tailpipe via a heat exchanger having a coolant flowing therethrough, in response to a higher than threshold difference between output of a first coolant temperature sensor positioned upstream of the heat exchanger and a first modeled coolant temperature which is based in part on heat transfer between a heat loss source and a vehicle cabin, and in response to a higher than threshold difference between output of a second coolant temperature sensor positioned downstream of the heat exchanger and a second modeled coolant temperature which is based in part on the first modeled coolant temperature, indicating degradation of one or more of the first and second coolant temperature sensors. In any preceding example, additionally or optionally, wherein the heat transfer between the heat loss source and the vehicle cabin is based on each of a rate of mass air flow between the heat loss source and ambient air and/or the vehicle cabin, a temperature of coolant entering the heat loss source from the engine, a temperature of air entering the heat loss source from the vehicle cabin, and a temperature of air entering the vehicle cabin from the heat loss source, the heat loss source including a heater core of an on-board heating, ventilation and air conditioning (HVAC) system receiving coolant from the engine. In any preceding example, additionally or optionally, wherein the second modeled coolant temperature is further based on heat transfer between the exhaust flowing via the heat exchanger and the coolant flowing through heat exchanger, the heat transfer between the exhaust and the coolant flowing through heat exchanger based on each of a rate of air flow between the exhaust and the heat exchanger, a temperature of coolant entering the heat exchanger, a temperature of air entering the heat exchanger from the exhaust, and a temperature of air entering the exhaust from the heat exchanger. Any preceding example further comprising, additionally or optionally, accumulating a first error between output of the first coolant temperature sensor and the first modeled coolant temperature over a threshold time period, accumulating a second error between output of the second coolant temperature sensor and the second modeled coolant temperature over the threshold time period, in response to the accumulated first error exceeding a threshold error, indicating degradation of the first sensor, and in response to the accumulated second error exceeding the threshold error, indicating degradation of the second sensor. In any preceding example, additionally or optionally, wherein exhaust flow from the vehicle engine to the tailpipe via the heat exchanger includes exhaust flow from a main exhaust passage to the heat exchanger via a diverter valve coupled to a junction of the main exhaust passage and an exhaust bypass housing the heat exchanger, and coolant flow through the heat exchanger includes coolant flowing from the vehicle engine to the heat exchanger via the heater core.

In yet another example, a vehicle system comprises: a vehicle system, comprising: an engine, a vehicle cabin, an engine intake manifold, an engine exhaust system including an exhaust passage and a bypass passage, the exhaust passage including one or more exhaust catalysts and a muffler, the bypass passage coupled to the exhaust passage from downstream of the one or more exhaust catalysts to upstream of the muffler, the bypass passage including a heat exchanger, a diverter valve coupling an inlet of the bypass passage to the exhaust passage, a diverter valve position sensor coupled to the diverter valve, a coolant system with an incoming coolant line and an outgoing coolant line for circulating coolant through the heat exchanger, the coolant system further coupled to each of an engine block and a heater core of a heating, ventilation and air conditioning (HVAC) system, the incoming coolant line including a first coolant temperature sensor for estimating a coolant temperature upstream of the heat exchanger, the outgoing coolant line including a second coolant temperature sensor for estimating a coolant temperature downstream of the heat exchanger, and a controller with computer readable instructions stored on non-transitory memory for performing the following while operating in a first mode: shifting the diverter valve to a first position to operate the exhaust system in the first mode with exhaust flowing from downstream of the exhaust catalyst to upstream of the muffler via the heat exchanger, and measuring a coolant temperature upstream of the heat exchanger via the first coolant temperature sensor, indicating degradation of the first coolant temperature sensor responsive to a higher than threshold difference between a modeled coolant temperature upstream of the heat exchanger and the measured coolant temperature upstream of the heat exchanger, and responsive to the indication of degradation, using the modeled temperature to estimate coolant temperature upstream of the heat exchanger. In any preceding example, additionally or optionally, wherein the controller contains further instructions while operating in the first mode for: measuring a position of the diverter valve via the position sensor, measuring a coolant temperature downstream of the heat exchanger via the second coolant temperature sensor, indicating degradation of the second coolant temperature sensor responsive to a higher than threshold difference between a modeled coolant temperature downstream of the heat exchanger and the measured coolant temperature downstream of the heat exchanger, indicating degradation of the diverter valve responsive to the position of the diverter valve being different from the first position, using the modeled temperature to estimate coolant temperature downstream of the heat exchanger responsive to the indication of degradation of the second coolant temperature sensor, and disabling operation of the exhaust system in the first mode responsive to the indication of degradation of the diverter valve. In any or all of the preceding examples, additionally or optionally, wherein the modeled coolant temperature upstream of the heat exchanger is based on one or more of air flow between the heater core and the vehicle cabin and coolant flow from the engine to the heater core, and wherein the modeled coolant temperature downstream of the heat exchanger is based on one or more of the modeled coolant temperature upstream of the heat exchanger, air flow between exhaust gas flowing through the heat exchanger and coolant flowing through the heat exchanger, and coolant flow from the heater core to the heat exchanger.

In a further representation, the vehicle is a hybrid vehicle system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   during exhaust flow from a vehicle engine across a heat exchanger having an engine coolant flowing therethrough,
   in response to a higher than threshold difference between a measured coolant temperature and a modeled coolant temperature which is based on heat transfer between a heat loss source and a vehicle cabin, indicating degradation of a first and/or a second coolant temperature sensor respectively coupled upstream and downstream of the heat exchanger,
   wherein the heat transfer between the heat loss source and the vehicle cabin is based on one or more of a mass air flow rate between the heat loss source and the vehicle cabin and a temperature of air entering the vehicle cabin from the heat loss source.

2. The method of claim 1, wherein the heat loss source includes a heater core and a plurality of engine coolant lines of an on-board heating, ventilation, and air conditioning (HVAC) system, where the engine coolant flows through the coolant lines.

3. The method of claim 1, wherein the measured coolant temperature includes a first measured coolant temperature upstream of the heat exchanger based on an input from the first coolant temperature sensor coupled to an engine coolant line entering the heat exchanger, the modeled coolant temperature includes a first modeled coolant temperature upstream of the heat exchanger, and indicating degradation of the first coolant temperature sensor coupled upstream of the heat exchanger is based on a higher than threshold difference between the first measured coolant temperature upstream of the heat exchanger and the first modeled coolant temperature upstream of the heat exchanger, the first modeled coolant temperature calibrated over a plurality of vehicle cabin heat settings.

4. The method of claim 1, wherein the heat transfer between the heat loss source and the vehicle cabin is further based on one or more of a temperature of coolant entering the heat loss source from the engine, a temperature of air entering the heat loss source from ambient air and/or the vehicle cabin, and an effectiveness of heat transfer between the heat loss source and the vehicle cabin, the effectiveness of heat transfer between the heat loss source and the vehicle cabin based on each of the mass air flow rate between the heat loss source and the vehicle cabin and a mass coolant flow rate via the heat loss source.

5. The method of claim 4, wherein the mass air flow rate between the heater core and the vehicle cabin is a function of a position of an air vent, the air vent allowing air flow between the heater core and the vehicle cabin.

6. The method of claim 4, wherein the measured coolant temperature further includes a second measured coolant temperature downstream of the heat exchanger based on an input from the second coolant temperature sensor coupled to an engine coolant line exiting the heat exchanger, the modeled coolant temperature further includes a second modeled coolant temperature downstream of the heat exchanger, and indicating degradation of the second coolant temperature sensor coupled downstream of the heat exchanger is based on a higher than threshold difference between the second measured coolant temperature downstream of the heat exchanger and the second modeled coolant temperature of the heat exchanger, wherein the second modeled coolant temperature downstream of the heat exchanger is based on each of the first modeled coolant temperature upstream of the heat exchanger and heat transfer between exhaust gas and the engine coolant flowing through the heat exchanger.

7. The method of claim 6, wherein the heat transfer between the exhaust gas and the engine coolant flowing through the heat exchanger is a function of one or more of a mass exhaust flow rate via the heat exchanger, a temperature of coolant entering the heat exchanger, a temperature of air entering the heat exchanger from the exhaust gas, a temperature of air entering the exhaust gas from the heat exchanger, and an effectiveness of heat transfer between the exhaust gas and the engine coolant flowing through the heat exchanger, the effectiveness of heat transfer between the exhaust gas and the engine coolant flowing through the heat exchanger based on each of the mass exhaust flow rate via the heat exchanger and the mass coolant flow rate via the heat exchanger.

8. The method of claim 7, wherein the heat exchanger is coupled to an exhaust bypass, the method further comprising adjusting a position of an exhaust diverter valve coupled to a junction of the exhaust bypass and a main exhaust passage to regulate exhaust flow via the heat exchanger to maintain a desired engine coolant temperature, the desired engine coolant temperature based on each of engine heating demand and/or vehicle cabin heating demand.

9. The method of claim 4, further comprising, in response to indication of degradation of the first coolant temperature sensor, using the first modeled coolant temperature for engine operations, and in response to indication of degradation of the second coolant temperature sensor, using the second modeled coolant temperature for engine operations.

10. The method of claim 8, wherein the mass exhaust flow rate via the heat exchanger is a function of each of the position of the exhaust diverter valve and a total exhaust flow rate via the main exhaust passage.

11. The method of claim 10, further comprising indicating degradation of the exhaust diverter valve responsive to an actual position of the exhaust diverter valve as estimated based on input from a diverter valve position sensor differing from an expected position of the exhaust diverter valve, wherein the expected position of the exhaust diverter valve includes one of a first position during a higher than threshold engine heating demand and/or a higher than threshold vehicle cabin heating demand enabling exhaust flow via the heat exchanger and a second position during a lower than threshold engine heating demand and a lower than threshold vehicle cabin heating demand disabling exhaust flow via the heat exchanger.

12. The method of claim 11, further comprising indicating degradation of the heat exchanger responsive to an expected temperature difference between coolant temperature upstream and downstream of the heat exchanger being different from an actual temperature difference between coolant temperature upstream and downstream of the heat exchanger, the expected temperature difference based on each of the actual position of the exhaust diverter valve, the mass coolant flow rate via the heat exchanger, and the exhaust flow rate, and the actual difference is based on inputs from the first coolant temperature sensor and the second coolant temperature sensor.

13. A method, comprising:
    during exhaust flow from a vehicle engine to a tailpipe via a heat exchanger having an engine coolant flowing therethrough,
    in response to a higher than threshold difference between output of a first coolant temperature sensor positioned upstream of the heat exchanger and a first modeled coolant temperature which is based in part on heat transfer between a heat loss source and a vehicle cabin, and in response to a higher than threshold difference between output of a second coolant temperature sensor positioned downstream of the heat exchanger and a second modeled coolant temperature which is based in part on the first modeled coolant temperature, indicating degradation of one or more of the first and second coolant temperature sensors,
    wherein the heat transfer between the heat loss source and the vehicle cabin is based on an effectiveness of heat transfer between the heat loss source and the vehicle cabin, the effectiveness of heat transfer between the heat loss source and the vehicle cabin based on each of a mass air flow rate between the heat loss source and the vehicle cabin and a mass coolant flow rate via the heat loss source.

14. The method of claim 13, wherein the heat transfer between the heat loss source and the vehicle cabin is further based on each of the mass air flow rate between the heat loss source and the vehicle cabin, a temperature of engine coolant entering the heat loss source from the engine, a temperature of air entering the heat loss source from the vehicle cabin, and a temperature of air entering the vehicle cabin from the heat loss source, the heat loss source including a heater core of an on-board heating, ventilation, and air conditioning (HVAC) system receiving coolant from the engine.

15. The method of claim 13, wherein the second modeled coolant temperature is further based on heat transfer between the exhaust flowing via the heat exchanger and the engine coolant flowing through the heat exchanger, the heat transfer between the exhaust and the engine coolant flowing through the heat exchanger based on each of a rate of air flow between the exhaust and the coolant flowing through the heat exchanger, a temperature of coolant entering the heat exchanger, a temperature of air entering the heat exchanger from the exhaust, and a temperature of air entering the exhaust from the heat exchanger.

16. The method of claim 13, further comprising accumulating a first error between output of the first coolant temperature sensor and the first modeled coolant temperature over a threshold time period, accumulating a second error between output of the second coolant temperature sensor and the second modeled coolant temperature over the threshold time period, in response to the accumulated first error exceeding a threshold error, indicating degradation of the first coolant temperature sensor, and in response to the accumulated second error exceeding the threshold error, indicating degradation of the second coolant temperature sensor.

17. The method of claim 13, wherein exhaust flow from the vehicle engine to the tailpipe via the heat exchanger includes exhaust flow from a main exhaust passage to the heat exchanger via a diverter valve coupled to a junction of the main exhaust passage and an exhaust bypass housing the heat exchanger, and engine coolant flow through the heat exchanger includes coolant flowing from the vehicle engine to the heat exchanger via a heater core.

18. A vehicle system, comprising:
an engine:
a vehicle cabin;
an engine intake manifold;
an engine exhaust system including an exhaust passage and a bypass passage, the exhaust passage including one or more exhaust catalysts and a muffler, the bypass passage coupled to the exhaust passage from downstream of the one or more exhaust catalysts to upstream of the muffler, the bypass passage including a heat exchanger;
a diverter valve coupling an inlet of the bypass passage to the exhaust passage;
a diverter valve position sensor coupled to the diverter valve;
a coolant system with an incoming coolant line and an outgoing coolant line for circulating coolant through the heat exchanger, the coolant system further coupled to each of an engine block and a heater core of a heating, ventilation, and air conditioning (HVAC) system, the incoming coolant line including a first coolant temperature sensor for estimating a coolant temperature upstream of the heat exchanger, the outgoing coolant line including a second coolant temperature sensor for estimating a coolant temperature downstream of the heat exchanger; and
a controller with computer readable instructions stored on non-transitory memory for:
shifting the diverter valve to a first position to operate the exhaust system in a first mode with exhaust flowing from downstream of the one or more exhaust catalysts to upstream of the muffler via the heat exchanger; and
while operating in the first mode,
measuring the coolant temperature upstream of the heat exchanger via the first coolant temperature sensor;
indicating degradation of the first coolant temperature sensor responsive to a higher than threshold difference between a modeled coolant temperature upstream of the heat exchanger and the measured coolant temperature upstream of the heat exchanger; and
responsive to the indication of degradation, using the modeled coolant temperature to estimate the coolant temperature upstream of the heat exchanger.

19. The system of claim 18, wherein the controller contains further instructions for:
while operating in the first mode,
measuring a position of the diverter valve via the diverter valve position sensor;
measuring the coolant temperature downstream of the heat exchanger via the second coolant temperature sensor;
indicating degradation of the second coolant temperature sensor responsive to a higher than threshold difference between a modeled coolant temperature downstream of the heat exchanger and the measured coolant temperature downstream of the heat exchanger;
indicating degradation of the diverter valve responsive to the position of the diverter valve being different from the first position;
using the modeled coolant temperature to estimate coolant temperature downstream of the heat exchanger responsive to the indication of degradation of the second coolant temperature sensor; and
disabling operation of the exhaust system in the first mode responsive to the indication of degradation of the diverter valve.

20. The system of claim 18, wherein the modeled coolant temperature upstream of the heat exchanger is based on one or more of air flow between the heater core and the vehicle cabin and coolant flow from the engine to the heater core, and wherein the modeled coolant temperature downstream of the heat exchanger is based on one or more of the modeled coolant temperature upstream of the heat exchanger, air flow between exhaust gas flowing through the heat exchanger and coolant flowing through the heat exchanger, and coolant flow from the heater core to the heat exchanger.

* * * * *